United States Patent
Mahmood et al.

(10) Patent No.: US 10,931,318 B2
(45) Date of Patent: Feb. 23, 2021

(54) SUBSAMPLED LINEARIZATION SYSTEM

(71) Applicant: NanoSemi, Inc, Waltham, MA (US)

(72) Inventors: Zohaib Mahmood, Westwood, MA (US); Alexandre Megretski, Concord, MA (US); Kevin Chuang, Cambridge, MA (US); Yan Li, Lexington, MA (US); Helen H. Kim, Sudbury, MA (US)

(73) Assignee: NanoSemi, Inc., Waltham, MA (US)

( * ) Notice: Subject to any disclaimer, the term of this patent is extended or adjusted under 35 U.S.C. 154(b) by 0 days.

(21) Appl. No.: 16/705,907

(22) Filed: Dec. 6, 2019

(65) Prior Publication Data
US 2020/0119755 A1    Apr. 16, 2020

Related U.S. Application Data

(63) Continuation-in-part of application No. PCT/US2018/036665, filed on Jun. 8, 2018.
(Continued)

(51) Int. Cl.
    *H04B 1/04* (2006.01)
(52) U.S. Cl.
    CPC ....... *H04B 1/04* (2013.01); *H04B 2001/0425* (2013.01)
(58) Field of Classification Search
    CPC .... H04B 1/04; H04B 2001/0408–0441; H04B 17/00; H04B 17/10; H04B 17/101–104; H04B 17/11–14
    See application file for complete search history.

(56) References Cited

U.S. PATENT DOCUMENTS 4,979,126 A * 12/1990 Pao ........................... G06N 3/04
                                                        706/25
5,819,165 A * 10/1998 Hulkko ................. H04W 52/52
                                                        455/126
(Continued)

FOREIGN PATENT DOCUMENTS

CN          101379718 A      3/2009
CN          101971507 A      2/2011
(Continued)

OTHER PUBLICATIONS

Cidronali, A., I. Magrini, R. Fagotti, and G. Manes. "A new approach for concurrent dual-band IF digital predistortion: System design and analysis." In 2008 Workshop on Integrated Nonlinear Microwave and Millimetre-Wave Circuits, pp. 127-130. IEEE, 2008.
(Continued)

*Primary Examiner* — James M Perez
(74) *Attorney, Agent, or Firm* — Occhiuti & Rohlicek LLP

(57) ABSTRACT

Disclosed are implementations that include a method comprising applying at least one input signal to a power amplification system, that includes a transmit chain with a power amplifier (PA) producing output with non-linear distortions, to produce at least one output signal, and measuring at least one observed signal of the output signal using an observation receiver coupled to an output of the transmit chain, the observation receiver having a receive bandwidth smaller than a transmit chain bandwidth of the transmit chain. Measuring the at least one observed signal includes measuring multiple frequency segments of output signal. The method further includes determining one or more sets of digital predistortion coefficients based on the measured multiple frequency segments of the at least one output signal, with each of the sets of digital predistortion coeffi-
(Continued)

cients being associated with a respective set of operating conditions of the power amplification system.

34 Claims, 10 Drawing Sheets

Related U.S. Application Data

(60) Provisional application No. 62/517,434, filed on Jun. 9, 2017, provisional application No. 62/776,787, filed on Dec. 7, 2018.

(56) References Cited

U.S. PATENT DOCUMENTS

| | | | | |
|---|---|---|---|---|
| 5,980,457 A * | 11/1999 | Averkiou | G01S 7/52038 | 600/437 |
| 6,052,412 A * | 4/2000 | Ruether | H04B 14/04 | 375/231 |
| 6,240,278 B1 * | 5/2001 | Midya | H03F 1/3258 | 455/126 |
| 6,288,610 B1 * | 9/2001 | Miyashita | H03F 1/3223 | 330/149 |
| 6,549,067 B1 * | 4/2003 | Kenington | H03F 1/3247 | 330/149 |
| 7,170,344 B2 * | 1/2007 | Suzuki | H03F 1/3241 | 330/149 |
| 7,289,773 B2 * | 10/2007 | Braithwaite | H03F 1/3235 | 375/297 |
| 7,295,815 B1 * | 11/2007 | Wright | H03F 1/3294 | 455/91 |
| 7,321,264 B2 * | 1/2008 | Kokkeler | H03F 1/3247 | 330/149 |
| 7,333,557 B2 * | 2/2008 | Rashev | H03F 1/3211 | 330/254 |
| 7,469,491 B2 * | 12/2008 | McCallister | H03F 1/3247 | 375/269 |
| 7,529,652 B1 * | 5/2009 | Gahinet | G06F 30/20 | 703/2 |
| 7,577,211 B2 * | 8/2009 | Braithwaite | H03F 1/3247 | 375/296 |
| 7,599,431 B1 * | 10/2009 | Anderson | H04L 25/03038 | 375/229 |
| 7,634,238 B2 * | 12/2009 | Suzuki | H03F 1/3252 | 455/105 |
| 7,796,960 B1 * | 9/2010 | Rashev | H03F 1/3258 | 455/114.3 |
| 7,904,033 B1 * | 3/2011 | Wright | H03F 1/34 | 455/114.2 |
| 8,185,066 B2 * | 5/2012 | Camp, Jr. | H03F 1/3247 | 455/114.3 |
| 8,306,149 B2 * | 11/2012 | Mujica | H04L 27/368 | 375/296 |
| 8,391,809 B1 * | 3/2013 | Fuller | H04B 1/0475 | 455/114.3 |
| 8,411,730 B2 * | 4/2013 | Maeda | H04L 25/06 | 375/219 |
| 8,446,979 B1 * | 5/2013 | Yee | H03F 1/3258 | 375/296 |
| 8,498,590 B1 * | 7/2013 | Rashev | H01Q 3/2605 | 455/114.2 |
| 8,519,789 B2 * | 8/2013 | Hawkes | H03F 1/3294 | 330/149 |
| 8,576,941 B2 * | 11/2013 | Bai | H03F 1/3247 | 375/296 |
| 8,644,437 B2 * | 2/2014 | Kim | H03F 1/3205 | 375/350 |
| 8,666,336 B1 * | 3/2014 | Dick | H04B 17/11 | 455/114.3 |
| 8,711,976 B2 * | 4/2014 | Chandrasekaran | H03F 1/3247 | 375/297 |
| 8,731,005 B2 * | 5/2014 | Schlee | H04B 17/12 | 370/516 |
| 8,731,105 B2 * | 5/2014 | Bai | H03F 1/3241 | 375/296 |
| 8,890,609 B2 * | 11/2014 | Laporte | H03F 1/3247 | 330/149 |
| 9,071,207 B2 * | 6/2015 | Bai | H03F 3/195 | |
| 9,130,628 B1 * | 9/2015 | Mittal | H04B 1/0475 | |
| 9,173,173 B2 * | 10/2015 | Wei | H04W 52/243 | |
| 9,184,710 B2 * | 11/2015 | Braithwaite | H03F 1/3241 | |
| 9,226,189 B1 * | 12/2015 | Kularatna | H04B 17/17 | |
| 9,252,712 B2 * | 2/2016 | Li | H03F 1/0205 | |
| 9,331,882 B2 * | 5/2016 | Fehri | H04B 1/0475 | |
| 9,337,782 B1 * | 5/2016 | Mauer | H03F 3/245 | |
| 9,564,876 B2 * | 2/2017 | Kim | H03H 17/0261 | |
| 9,590,668 B1 * | 3/2017 | Kim | H03F 1/3252 | |
| 9,595,920 B2 * | 3/2017 | Li | H03F 1/223 | |
| 9,614,557 B1 * | 4/2017 | Mayer | H04L 1/0042 | |
| 9,621,236 B2 * | 4/2017 | Ghannouchi | H04B 7/0639 | |
| 9,628,119 B2 * | 4/2017 | Gal | H03F 1/3241 | |
| 9,722,646 B1 * | 8/2017 | Matthews | H03F 3/195 | |
| 9,749,161 B1 * | 8/2017 | Gal | H04B 1/0475 | |
| 9,831,899 B1 * | 11/2017 | Boghrat | H03F 3/245 | |
| 9,935,810 B1 * | 4/2018 | Hammler | H03F 1/3247 | |
| 9,973,370 B1 * | 5/2018 | Langer | H04W 52/365 | |
| 10,033,413 B2 * | 7/2018 | Pratt | H03F 1/3294 | |
| 10,033,414 B2 * | 7/2018 | Ota | H04B 1/0475 | |
| 10,079,699 B1 * | 9/2018 | Li | H04L 27/10 | |
| 10,080,178 B2 * | 9/2018 | Stapleton | H04B 7/022 | |
| 10,141,896 B2 * | 11/2018 | Huang | H03F 1/3247 | |
| 10,141,961 B1 * | 11/2018 | Huang | H04B 1/12 | |
| 10,181,914 B2 * | 1/2019 | Li | H04B 1/0475 | |
| 10,404,296 B2 * | 9/2019 | Kim | H03F 1/3241 | |
| 10,447,511 B2 * | 10/2019 | Xie | H04L 27/10 | |
| 10,469,109 B2 * | 11/2019 | Gutman | H03F 3/24 | |
| 10,523,159 B2 * | 12/2019 | Megretski | H03F 1/3282 | |
| 10,581,470 B2 * | 3/2020 | Megretski | H04B 1/0475 | |
| 10,623,118 B2 * | 4/2020 | Lagoy | H04B 1/0483 | |
| 10,644,657 B1 * | 5/2020 | Megretski | H04B 1/0475 | |
| 10,763,904 B2 * | 9/2020 | Megretski | H04B 1/0475 | |
| 10,812,166 B2 * | 10/2020 | Kim | H04B 7/0617 | |
| 10,826,739 B1 * | 11/2020 | Fomin | H03H 17/0202 | |
| 2001/0050592 A1 * | 12/2001 | Wright | H03F 1/3258 | 330/2 |
| 2002/0080891 A1 * | 6/2002 | Ahn | H04L 27/368 | 375/297 |
| 2003/0058960 A1 * | 3/2003 | Lee | H03F 1/3294 | 375/297 |
| 2003/0184374 A1 * | 10/2003 | Huang | H03F 1/3294 | 330/149 |
| 2003/0207680 A1 * | 11/2003 | Yang | H04L 1/0043 | 455/341 |
| 2004/0076247 A1 * | 4/2004 | Barak | H04L 27/2623 | 375/350 |
| 2004/0116083 A1 * | 6/2004 | Suzuki | H03F 1/3258 | 455/126 |
| 2004/0121741 A1 * | 6/2004 | Rashev | H04L 27/368 | 455/114.3 |
| 2004/0142667 A1 * | 7/2004 | Lochhead | H03F 1/3294 | 455/114.3 |
| 2004/0196922 A1 * | 10/2004 | Leffel | H03F 1/3247 | 375/297 |
| 2005/0001684 A1 * | 1/2005 | Braithwaite | H03F 1/3247 | 330/263 |
| 2005/0163251 A1 * | 7/2005 | McCallister | H03F 1/3241 | 375/296 |
| 2005/0163252 A1 * | 7/2005 | McCallister | H03F 1/3247 | 375/296 |
| 2005/0180527 A1 * | 8/2005 | Suzuki | H03F 1/3258 | 375/297 |
| 2005/0190857 A1 * | 9/2005 | Braithwaite | H03F 1/3258 | 375/296 |
| 2006/0022751 A1 * | 2/2006 | Fuller | H03F 1/0211 | 330/136 |
| 2006/0154622 A1 * | 7/2006 | Piirainen | H03F 1/32 | 455/115.1 |
| 2006/0229036 A1 * | 10/2006 | Muller | H03F 1/3282 | 455/114.3 |

(56) References Cited

U.S. PATENT DOCUMENTS

| | | | |
|---|---|---|---|
| 2006/0276147 A1* | 12/2006 | Suzuki | H03F 1/3258 455/114.3 |
| 2007/0091992 A1* | 4/2007 | Dowling | H04L 25/45 375/229 |
| 2007/0230557 A1* | 10/2007 | Balasubramonian | H04L 25/03057 375/234 |
| 2007/0241812 A1* | 10/2007 | Yang | H03F 3/21 330/75 |
| 2008/0003945 A1* | 1/2008 | Wenham | H04L 12/2816 455/41.2 |
| 2008/0019453 A1* | 1/2008 | Zhao | H04L 27/2623 375/260 |
| 2008/0039045 A1* | 2/2008 | Filipovic | H04B 1/123 455/295 |
| 2008/0057882 A1* | 3/2008 | Singerl | H03F 1/3258 455/115.1 |
| 2008/0101502 A1* | 5/2008 | Navidpour | H04L 1/06 375/296 |
| 2008/0247487 A1* | 10/2008 | Cai | H04L 27/2623 375/296 |
| 2008/0260066 A1* | 10/2008 | Cai | H03F 1/3294 375/297 |
| 2008/0268795 A1* | 10/2008 | Saed | H04M 1/00 455/114.3 |
| 2008/0285640 A1* | 11/2008 | McCallister | H04L 25/03343 375/233 |
| 2009/0201084 A1* | 8/2009 | See | H03F 3/211 330/51 |
| 2010/0026354 A1* | 2/2010 | Utsunomiya | H04B 1/0475 327/161 |
| 2010/0048149 A1* | 2/2010 | Tang | H04L 27/366 455/114.3 |
| 2010/0225390 A1 | 9/2010 | Brown et al. | |
| 2010/0297966 A1* | 11/2010 | Row | H03F 3/24 455/114.3 |
| 2011/0044158 A1* | 2/2011 | Tao | H04B 7/15592 370/201 |
| 2011/0085490 A1* | 4/2011 | Schlee | H04B 17/102 370/315 |
| 2011/0098011 A1* | 4/2011 | Camp, Jr. | H03F 1/0266 455/114.3 |
| 2011/0128992 A1* | 6/2011 | Maeda | H04L 27/3863 375/130 |
| 2011/0135035 A1* | 6/2011 | Bose | H04L 27/36 375/300 |
| 2011/0150130 A1* | 6/2011 | Kenington | H03F 3/24 375/296 |
| 2011/0163806 A1* | 7/2011 | Hongo | H03F 1/3258 330/149 |
| 2011/0187437 A1* | 8/2011 | Perreault | H03F 1/56 327/355 |
| 2011/0235734 A1* | 9/2011 | Kenington | H04B 7/0623 375/267 |
| 2011/0255627 A1* | 10/2011 | Gotman | H04L 27/2624 375/285 |
| 2011/0273234 A1* | 11/2011 | van der Heijden | H03F 1/565 330/295 |
| 2011/0273236 A1* | 11/2011 | Heijden | H03F 1/0294 330/295 |
| 2012/0093210 A1* | 4/2012 | Schmidt | H04L 27/2624 375/224 |
| 2012/0108189 A1* | 5/2012 | McCallister | H03F 1/301 455/127.2 |
| 2012/0119810 A1* | 5/2012 | Bai | H03F 1/3252 327/317 |
| 2012/0119811 A1* | 5/2012 | Bai | H03F 1/3247 327/317 |
| 2012/0119831 A1* | 5/2012 | Bai | H03F 1/3247 330/149 |
| 2012/0154033 A1* | 6/2012 | Lozhkin | H03F 1/3247 330/124 R |
| 2012/0154430 A1* | 6/2012 | Matsushima | G06F 3/0488 345/619 |
| 2012/0176195 A1* | 7/2012 | Dawson | H03F 3/2176 330/124 R |
| 2012/0200355 A1* | 8/2012 | Braithwaite | H03F 1/3241 330/147 |
| 2012/0219048 A1* | 8/2012 | Camuffo | H03F 3/72 375/224 |
| 2012/0286865 A1* | 11/2012 | Chandrasekaran | H03F 3/195 330/149 |
| 2012/0286985 A1* | 11/2012 | Chandrasekaran | H03F 3/24 341/144 |
| 2012/0293252 A1* | 11/2012 | Sorrells | H03F 3/211 330/124 R |
| 2012/0295558 A1* | 11/2012 | Wang | H04B 1/109 455/79 |
| 2013/0033317 A1* | 2/2013 | Hawkes | H03F 1/3294 330/149 |
| 2013/0034188 A1* | 2/2013 | Rashev | H04L 25/03063 375/297 |
| 2013/0044791 A1* | 2/2013 | Rimini | H04B 1/30 375/219 |
| 2013/0064325 A1* | 3/2013 | Kilambi | H03F 1/3247 375/297 |
| 2013/0094610 A1* | 4/2013 | Ghannouchi | H03F 1/3247 375/296 |
| 2013/0094612 A1* | 4/2013 | Kim | H04B 1/0475 375/297 |
| 2013/0163512 A1* | 6/2013 | Rexberg | H04B 1/0475 370/328 |
| 2013/0243121 A1* | 9/2013 | Bai | H03F 3/245 375/297 |
| 2013/0251065 A1* | 9/2013 | Bai | H03F 1/3247 375/296 |
| 2013/0259159 A1* | 10/2013 | McCallister | H03F 1/34 375/297 |
| 2013/0329833 A1* | 12/2013 | Bai | H03F 1/3247 375/297 |
| 2014/0009225 A1* | 1/2014 | Laporte | H03F 1/3247 330/103 |
| 2014/0038659 A1* | 2/2014 | Wei | H04W 52/367 455/522 |
| 2014/0139286 A1* | 5/2014 | Laporte | H04L 27/368 330/149 |
| 2014/0161159 A1* | 6/2014 | Black | H04B 1/0475 375/219 |
| 2014/0161207 A1* | 6/2014 | Teterwak | H04L 1/0033 375/297 |
| 2014/0177695 A1* | 6/2014 | Cha | H04L 25/03133 375/231 |
| 2014/0187182 A1* | 7/2014 | Yan | H03F 1/0222 455/115.1 |
| 2014/0254716 A1* | 9/2014 | Zhou | H03F 1/3247 375/296 |
| 2014/0274105 A1* | 9/2014 | Wang | H04W 52/241 455/454 |
| 2014/0292579 A1* | 10/2014 | Oh | H01Q 3/38 342/372 |
| 2014/0347126 A1* | 11/2014 | Laporte | H03F 3/24 330/149 |
| 2015/0043313 A1* | 2/2015 | Stranczl | G04B 15/14 368/131 |
| 2015/0043323 A1* | 2/2015 | Choi | G06F 17/11 370/203 |
| 2015/0043678 A1* | 2/2015 | Hammi | H03F 1/3258 375/297 |
| 2015/0049841 A1* | 2/2015 | Laporte | H03F 1/34 375/297 |
| 2015/0061761 A1* | 3/2015 | Wills | H03F 1/0227 330/127 |
| 2015/0103952 A1* | 4/2015 | Wang | H03F 3/24 375/297 |
| 2015/0123735 A1* | 5/2015 | Wimpenny | H03F 1/0227 330/295 |
| 2015/0124907 A1* | 5/2015 | Li | H03F 3/245 375/320 |

(56) References Cited

U.S. PATENT DOCUMENTS

| | | | |
|---|---|---|---|
| 2015/0171768 A1* | 6/2015 | Perreault | H03F 3/245 330/251 |
| 2015/0325913 A1* | 11/2015 | Vagman | H01Q 21/296 342/368 |
| 2015/0326349 A1* | 11/2015 | Yang | H03F 1/3247 375/297 |
| 2015/0333781 A1* | 11/2015 | Alon | H03F 3/19 370/277 |
| 2015/0357975 A1* | 12/2015 | Avniel | H03F 1/0294 330/310 |
| 2015/0358039 A1* | 12/2015 | Xiong | H04B 1/62 375/297 |
| 2015/0381216 A1* | 12/2015 | Shor | H04B 1/0475 375/297 |
| 2015/0381220 A1* | 12/2015 | Gal | H04B 1/0475 375/296 |
| 2016/0013820 A1* | 1/2016 | Yamanouchi | H04B 1/0475 375/297 |
| 2016/0028433 A1* | 1/2016 | Ding | H04B 1/62 375/297 |
| 2016/0043753 A1* | 2/2016 | Jungnickel | E21B 47/16 375/295 |
| 2016/0065147 A1* | 3/2016 | Pratt | H03F 3/195 330/75 |
| 2016/0087604 A1* | 3/2016 | Kim | H03H 17/0261 708/304 |
| 2016/0094253 A1* | 3/2016 | Weber | H03M 1/1245 455/114.3 |
| 2016/0095110 A1* | 3/2016 | Li | H04W 72/1215 370/329 |
| 2016/0100180 A1* | 4/2016 | Oh | H04N 19/573 375/240.08 |
| 2016/0112222 A1* | 4/2016 | Pashay-Kojouri | H04L 25/49 375/296 |
| 2016/0174118 A1* | 6/2016 | Duan | H04W 36/24 370/329 |
| 2016/0191020 A1* | 6/2016 | Velazquez | H03H 21/0067 341/118 |
| 2016/0211577 A1* | 7/2016 | Miller | H04K 3/00 |
| 2016/0241277 A1* | 8/2016 | Rexberg | H03F 3/24 |
| 2016/0249300 A1* | 8/2016 | Tsai | H04B 17/13 |
| 2016/0285485 A1* | 9/2016 | Fehri | H03F 1/3247 |
| 2016/0308577 A1* | 10/2016 | Molina | H04L 25/03012 |
| 2016/0336906 A1* | 11/2016 | Lee | H03F 1/02 |
| 2016/0373072 A1* | 12/2016 | Magesacher | H04B 1/0475 |
| 2017/0005627 A1* | 1/2017 | Zhao | H03F 3/24 |
| 2017/0033969 A1* | 2/2017 | Yang | H03F 3/189 |
| 2017/0041124 A1* | 2/2017 | Khandani | H04B 1/50 |
| 2017/0047899 A1* | 2/2017 | Abdelrahman | H03F 1/3247 |
| 2017/0077981 A1* | 3/2017 | Tobisu | H04B 1/0475 |
| 2017/0176507 A1* | 6/2017 | O'Keeffe | H04B 1/0483 |
| 2017/0214438 A1* | 7/2017 | Ghannouchi | H04B 7/0417 |
| 2017/0237455 A1* | 8/2017 | Ye | H03F 3/19 455/114.3 |
| 2017/0244582 A1* | 8/2017 | Gal | H04L 25/03057 |
| 2017/0302233 A1* | 10/2017 | Huang | G06F 17/10 |
| 2017/0338841 A1* | 11/2017 | Pratt | H04B 1/0475 |
| 2018/0097530 A1* | 4/2018 | Yang | H04B 1/0475 |
| 2018/0159568 A1* | 6/2018 | Matsuura | H04B 1/006 |
| 2018/0167092 A1* | 6/2018 | Hausmair | H04B 1/0483 |
| 2018/0287569 A1* | 10/2018 | Xu | H03F 3/211 |
| 2018/0337700 A1* | 11/2018 | Huang | H04B 1/525 |
| 2019/0007075 A1* | 1/2019 | Kim | H03F 1/3258 |
| 2019/0097662 A1* | 3/2019 | Hornbuckle | H04B 1/16 |
| 2019/0104000 A1* | 4/2019 | Xie | H04L 25/03057 |
| 2019/0238204 A1* | 8/2019 | Kim | H04L 27/367 |
| 2019/0260401 A1* | 8/2019 | Megretski | H03F 1/3258 |
| 2019/0260402 A1* | 8/2019 | Chuang | H04B 1/0475 |
| 2019/0348956 A1* | 11/2019 | Megretski | H03F 1/025 |
| 2019/0363676 A1* | 11/2019 | Megretski | H04B 1/0475 |
| 2019/0363742 A1* | 11/2019 | Megretski | G06F 16/221 |
| 2020/0028476 A1* | 1/2020 | Kim | H03F 1/3247 |
| 2020/0067543 A1* | 2/2020 | Kim | H04L 41/0654 |
| 2020/0119755 A1* | 4/2020 | Mahmood | H04B 1/04 |

FOREIGN PATENT DOCUMENTS

| | | |
|---|---|---|
| CN | 104796170 A | 7/2015 |
| CN | 104871433 A | 8/2015 |
| CN | 105634539 A | 6/2016 |
| CN | 106464280 A | 2/2017 |
| EP | 0916967 A2 | 5/1999 |
| EP | 1560329 A1 | 8/2005 |
| EP | 1732208 A1 | 12/2006 |
| EP | 2991221 A1 | 3/2016 |
| JP | 2005-065211 A | 3/2005 |
| JP | 2010-136123 A | 6/2010 |
| JP | 2013-542696 A | 11/2013 |
| JP | 2014-533017 A | 12/2014 |
| WO | 20120154430 A1 | 11/2012 |
| WO | 2015107392 A1 | 7/2015 |
| WO | 2018156932 A1 | 8/2018 |
| WO | 2018227093 A1 | 12/2018 |
| WO | 2018227111 A1 | 12/2018 |
| WO | 2019/014422 A1 | 1/2019 |
| WO | 2019031714 A1 | 2/2019 |
| WO | 2019070573 A1 | 4/2019 |
| WO | 2019094713 A1 | 5/2019 |
| WO | 2019094720 A1 | 5/2019 |

OTHER PUBLICATIONS

Aguirre, et al., "On the Interpretation and Practice of Dynamical Differences Between Hammerstein and Wiener Models", IEEE Proceedings on Control TheoryAppl; vol. 152, No. 4, Jul. 2005, pp. 349-356.

Barradas, et al. "Polynomials and LUTs in PA Behavioral Modeling: A Fair Theoretical Comparison", IEEE Transactions on Microwave Theory and Techniques; vol. 62, No. 12, Dec. 2014, pp. 3274-3285.

Bosch et al. "Measurement and Simulation of Memory Effects in Predistortion Linearizers," IEEE Transactions on Mircrowave Theory and Techniques; vol. 37.No. 12; Dec. 1989, pp. 1885-1890.

Braithwaite, et al. "Closed-Loop Digital Predistortion (DPD) Using an Observation Path with Limited Bandwidth" IEEE Transactions on Microwave Theory and Techniques; vol. 63, No. 2; Feb. 2015, pp. 726-736.

Cavers, "Amplifier Linearization Using a Digital Predistorter with Fast Adaption and Low Memory Requirements;" IEEE Transactions on Vehicular Technology; vol. 39; No. 4; Nov. 1990, pp. 374-382.

D'Andrea et al., "Nonlinear Predistortion of OFDM Signals over Frequency-Selective Fading Channels," IEEE Transactions on Communications; vol. 49; No. 5, May 2001; pp. 837-843.

Guan, et al. "Optimized Low-Complexity Implementation of Least Squares Based Model Extraction of Digital Predistortion of RF Power Amplifiers", IEEE Transactions on Microwave Theory and Techniques; vol. 60, No. 3, Mar. 2012; pp. 594-603.

Henrie, et al., "Cancellation of Passive Intermodulation Distortion in Microwave Networks", Proceedings of the 38.sup.th European Microwave Conference, Oct. 2008, Amsterdam, The Netherlands, pp. 1153-1156.

Hong et al., "Weighted Polynomial Digital Predistortion for Low Memory Effect Doherty Power Amplifier," IEEE Transactions on Microwave Theory and Techniques; vol. 55; No. 5, May 2007, pp. 925-931.

Kwan, et al., "Concurrent Multi-Band Envelope Modulated Power Amplifier Linearized Using Extended Phase-Aligned DPD", IEEE Transactions on Microwave Theory and Techniques; vol. 62, No. 12, Dec. 2014, pp. 3298-3308.

Lajoinie et al. Efficient Simulation of NPR for the Optimum Design of Satellite Transponders SSPAs, EEE MTT-S International; vol. 2; Jun. 1998; pp. 741-744.

Li et al. "High-Throughput Signal Component Separator for Asymmetric Multi-Level Outphasing Power Amplifiers," IEEE Journal of Solid-State Circuits; vol. 48; No. 2; Feb. 2013; pp. 369-380.

(56) References Cited

OTHER PUBLICATIONS

Liang, et al. "A Quadratic-Interpolated Lut-Based Digital Predistortion Techniques for Cellular Power Amplifiers", IEEE Transactions on Circuits and Systems; II: Express Briefs, vol. 61, No. 3, Mar. 2014; pp. 133-137.
Liu, et al. "Digital Predistortion for Concurrent Dual-Band Transmitters Using 2-D Modified Memory Polynomials", IEEE Transactions on Microwave Theory and Techniques, vol. 61, No. 1, Jan. 2013, pp. 281-290.
Molina, et al. "Digital Predistortion Using Lookup Tables with Linear Interpolation and Extrapolation: Direct Least Squares Coefficient Adaptation", IEEE Transactions on Microwave Theory and Techniques, vol. 65, No. 3, Mar. 2017; pp. 980-987.
Morgan, et al. "A Generalized Memory Polynomial Model for Digital Predistortion of RF Power Amplifiers," IEEE Transactions of Signal Processing; vol. 54; No. 10; Oct. 2006; pp. 3852-3860.
Muta et al., "Adaptive predistortion linearization based on orthogonal polynomial expansion for nonlinear power amplifiers in OFDM systems", Communications and Signal Processing (ICCP), International Conference on, IEEE, pp. 512-516, 2011.
Naraharisetti, et a., "2D Cubic Spline Implementation for Concurrent Dual-Band System", IEEE, 2013, pp. 1-4.
Naraharisetti, et al. "Efficient Least-Squares 2-D-Cubic Spline for Concurrent Dual-Band Systems", IEEE Transactions on Microwave Theory and Techniques, vol. 63; No. 7, Jul. 2015; pp. 2199-2210.
Panigada, et al. "A 130 mW 100 MS/s Pipelined ADC with 69 SNDR Enabled by Digital Harmonic Distortion Correction," IEEE Journal of Solid-State Circuits; vol. 44; No. 12; Dec. 2009, pp. 3314-3328.
Peng, et al. "Digital Predistortion for Power Amplifier Based on Sparse Bayesian Learning", IEEE Transactions on Circuits and Systems, II: Express Briefs; 2015, pp. 1-5.
Quindroit et al. "FPGA Implementation of Orthogonal 2D Digital Predistortion System for Concurrent Dual-Band Power Amplifiers Based on Time-Division Multiplexing", IEEE Transactions on Microwave Theory and Techniques; vol. 61; No. 12, Dec. 2013, pp. 4591-4599.
Rawat, et al. "Adaptive Digital Predistortion of Wireless Power Amplifiers/Transmitters Using Dynamic Real-Valued Focused Time-Delay Line Neural Networks", IEEE Transactions on Microwave Theory and Techniques; vol. 58, No. 1; Jan. 2010; pp. 95-104.

Safari, et al. "Spline-Based Model for Digital Predistortion of Wide-Band Signals for High Power Amplifier Linearization", IEEE; 2007, pp. 1441-1444.
Sevic, et al. "A Novel Envelope—Termination Load—Pull Method of ACPR Optimization of RF/Microwave Power Amplifiers," IEEE MTT-S International; vol. 2, Jun. 1998; pp. 723-726.
Tai, "Efficient Watt-Level Power Amplifiers in Deeply Scaled CMOS, " Ph.D. Dissertation; Carnegie Mellon University; May 2011; 129 pages.
Tehran, et al. "Modeling of Long Term Memory Effects in RF Power Amplifiers with Dynamic Parameters", IEEE; 2012, pp. 1-3.
Yu et al. "A Generalized Model Based on Canonical Piecewise Linear Functions for Digital Predistortion", Proceedings of the Asia-Pacific Microwave Conference; 2016, pp. 1-4.
Yu, et al. "Band-Limited Volterra Series-Based Digital Predistortion for Wideband RF Power Amplifiers," IEEE Transactions of Microwave Theory and Techniques; vol. 60; No. 12; Dec. 2012, pp. 4198-4208.
Yu, et al. "Digital Predistortion Using Adaptive Basis Functions", IEEE Transations on Circuits and Systems—I. Regular Papers; vol. 60, No. 12; Dec. 2013, pp. 3317-3327.
Zhang et al. "Linearity Performance of Outphasing Power Amplifier Systems," Design of Linear Outphasing Power Amplifiers; Google e-book; 2003; Retrieved on Jun. 13, 2014; Retrieved from Internet <URL:http:www.artechhouse.com/uploads/public/documents/chapters/Zhang-LarsonCH- 2.pdf; pp. 35-85.
Zhu et al. "Digital Predistortion for Envelope-Tracking Power Amplifiers Using Decomposed Piecewise Volterra Sereis," IEEE Transactions on Microwave Theory and Techniques; vol. 56; No. 10; Oct. 2008; pp. 2237-2247.
Henrie, Justin, Andrew Christianson, and William J. Chappell. "Cancellation of passive intermodulation distortion in microwave networks." In Microwave Conference, 2008. EuMC 2008. 38th European, pp. 1153-1156. IEEE, 2008.
Riihonen et al., "Mitigation of Loopback Self-Interference in Full-Duplex Mimo Relays" IEEE Transactions on Signal Processing, 59(12), 5983-5993, Dec. 2011.
Cheng, Sheng-Lung, Wen-Rong Wu, Chun-Hsien Peng, Chen-Jui Hsu, and Paul Liang. "Digital predistortion for concurrent dual-band transmitter using a 2D LUT based method." In 2015 IEEE 16th Annual Wireless and Microwave Technology Conference (WAMICON), pp. 1-4. IEEE, 2015.
International Search Report and Written Opinion, PCT Application No. PCT/US2018/036665, dated Aug. 31, 2018 (8 pages).

* cited by examiner

SUBSAMPLED LINEARIZATION SYSTEM

CROSS-REFERENCE TO RELATED APPLICATIONS

This application is a continuation-in-part (CIP) application of, and claims priority to, International Application No. PCT/US2018/036665, entitled "SUBSAMPLED LINEARIZATION SYSTEM" filed Jun. 8, 2018, which claims the benefit of U.S. Provisional Application No. 62/517,434, filed Jun. 9, 2017. The present application also claims the benefit of, and priority to, U.S. Provisional Application No. 62/776,787, entitled "SUBSAMPLED LINEARIZATION SYSTEM" filed Dec. 7, 2018. The contents of all of the above-identified applications are herein incorporated by reference in their entireties.

BACKGROUND

The present disclosure relates to linearization of a system based on subsampled output, and more particularly relates to linearization of a radio-frequency transmitter using a digital pre-distorter that is based on a subsampled sensing of the output of the transmitter.

One approach to digital predistortion makes use of a Digital Pre-Distorter (DPD) whose parameters (or coefficients) are determined from a sensing of the output and known input characterizing the desired output. Non-linear characteristics often result in the output of the system having a larger bandwidth than the bandwidth of the input signal. Additionally, the observation receiver used for sensing (observing) the output signal commonly has a bandwidth that is commensurate with the size of the input signal bandwidth. Thus, the observation receiver bandwidth is typically smaller than the bandwidth of the output signal. Consequently, determining the parameters of a DPD becomes difficult when a feedback/observation receiver that senses the output has a bandwidth that does not capture non-linear effects outside the desired transmit bandwidth (or has a bandwidth that is not even as large as the bandwidth of the input signal).

SUMMARY

In a general aspect, a linearization system has a receive sensor (e.g., a feedback/observation receiver) with a smaller bandwidth than the transmit bandwidth of a transmit chain. The system performs a calibration in a configuration where a number of digital predistorter coefficients (or parameters) are determined, for the whole transmit chain transmit bandwidth, at different operating points. The calibration configuration stores the digital predistorter coefficients (or parameters) in a database. In a runtime phase, a sensed version of the transmit chain output signal, with the much smaller receive sensor bandwidth, is used to infer an operating point of the transmit chain, which is used in turn to configure the digital predistorter according to the digital predistorter configuration associated with the inferred operating point, which is stored in the database.

Certain aspects introduce a regularization coefficient to improve robustness, scan the full transmit bandwidth by sweeping receiver LO frequency in steps, use that information to get information about the channel which is then used to construct "full" information to design a DPD, and construct a database of DPD designs by varying operation conditions. During runtime, partial/incomplete information is used to navigate the database as opposed to running a full design Thus, in some variations, a method for digital predistortion is provided that includes applying at least one input signal to a power amplification system, that includes a transmit chain with at least a power amplifier that produces output with non-linear distortions, to produce at least one output signal, and measuring at least one observed signal of the at least one output signal using an observation receiver coupled to an output of the transmit chain of the power amplification system, the observation receiver having a receive bandwidth smaller than a transmit chain bandwidth of the transmit chain. The method further includes determining one or more sets of digital predistortion coefficients controlling operations of a digital predistorter applied to signals inputted to the transmit chain based, at least in part, on the measured multiple frequency segments of the at least one output signal, with each of the one or more sets of digital predistortion coefficients being associated with a respective one of one or more sets of operating conditions of the power amplification system.

Embodiments of the method may include at least some of the features described in the present disclosure, including one or more of the following features.

Determining the one or more sets of digital predistortion coefficients controlling the operations of the digital predistorter may include arranging the determined one or more sets of digital predistortion coefficients into M records in a data structure, each of the M records including K digital predistortion coefficients, with M representing a number of the one or more sets of operating conditions.

The data structure may be configured to be accessed to compute digital predistortion coefficients applied to subsequent input signals provided to the transmit chain, the digital predistortion coefficients computed as a weighted combination of at least some of the one or more sets of digital predistortion coefficient sets derived based on at least one of sensed subsequent outputs of the transmit chain responsive to the subsequent input signals.

Arranging the determined one or more sets of digital predistortion coefficients may include arranging the one or more sets of digital predistortion coefficients in a K×M matrix, L.

The method may further include deriving a reduced size matrix, L', with a reduced number of columns M', from the matrix L, wherein M'<M.

Deriving the reduced size matrix, L' may include applying a singular value decomposition process on the matrix L to derive the reduced size matrix L'.

Measuring the multiple frequency segments may include obtaining signal measurements of the at least one output signal at substantially equal frequency steps covering the transmit chain bandwidth.

Obtaining the signal measurements of the at least one output signal at the substantially equal frequency steps may include obtaining N signal measurements of the at least one output signal at the substantially equal frequency steps, with N being computed according to $$N = \left\lceil \frac{BW_{TX}}{BW_{RX}} \right\rceil_{CEIL},$$

with $BW_{TX}$ being the transmit chain bandwidth, and with $BW_{RX}$ being the receive bandwidth of the observation receiver. $\lceil \ \rceil_{CEIL}$ is ceiling operator.

Obtaining the N signal measurements may include performing N adjustments of a receiver Local Oscillation frequency, $LO_{RX}$, generated by a local oscillator of the observation receiver, and, at each of the N adjustments of the receiver oscillation frequency, measuring a respective one of the multiple frequency segments of the at least one output signal.

Performing the N adjustments of the receiver oscillation frequency may include adjusting the receiver oscillation frequency according to:

$$LO_{RX} = LO_{TX} - \left\lceil \frac{BW_{TX}}{2} \right\rceil_{CEIL} + (n-1) \times BW_{RX},$$
$$\forall \in 1, 2, \ldots N,$$

with $LO_{TX}$ being a transmit oscillation frequency of a transmit chain local oscillator.

The one or more sets of operating conditions of the power amplification system may include one or more of, for example, a temperature of the power amplification system, output power of the power amplification system, loading conditions for the power amplification system, power supply voltage for the power amplification system, and/or device type for the power amplification system.

Determining the one or more sets of digital predistortion coefficients may include determining a particular set of digital predistortion coefficients from the one or more sets of digital predistortion coefficients by applying a minimization procedure to derive a set of predictor coefficients that minimize a function applied to a particular one of the at least one input signal and the measured multiple frequency segments of a resultant particular one of the at least one output signal.

Determining the particular set of digital predistortion coefficients from the one or more sets of digital predistortion coefficients by applying the minimization procedure may include applying a regularized minimization procedure to compute the particular set of digital predistortion coefficients according to: $x_{OR}$=argmin ($\|Ax-b\|+\rho\|x\|$), where $\rho$ is a regularization coefficient, and $X_{OR}$ is a vector of optimal coefficients with regularization. Here A is a matrix of basis functions, x is the unknown vector of coefficients and b is a vector with observed data.

Measuring the multiple frequency segments of the at least one output signal may include subsampling a measured signal observed with the observation receiver of the at least one output signal of the output of the transmit chain to produce a resultant subsampled signal having a spectral representation that is a folded copy of an original spectral representation of the measured signal. The observation receiver may include a local oscillator operating at a fixed local frequency. The observation receiver may be implemented without an anti-aliasing filter.

In some variations, a method for digital predistortion is provided that includes measuring, by an observation receiver of a power amplification system comprising a transmit chain with at least a power amplifier that produces output with non-linear distortions, an observed output signal resulting from an input signal provided to the transmit chain, the observation receiver having a receive bandwidth smaller than a transmit channel bandwidth of the transmit chain, with the observed output signal being associated with an observed output signal bandwidth. The method further includes determining, based on the observed output signal, digital predistortion coefficients, to be applied to input signals provided to the transmit chain, as a weighed combination of at least some of pre-determined sets of digital predistortion coefficients computed according to an earlier applied calibration procedure associated with a calibration frequency bandwidth for measuring early output signals of the transmit chain resulting from application of respective early input signals during respective early sets of operating conditions for the power amplification system, with the calibration frequency bandwidth being larger than the observed output signal bandwidth.

Embodiments of the method may include at least some of the features described in the present disclosure, including at least some of the features described above in relation to the first method, as well as one or more of the following features.

Determining, based on the observed output signal, the digital predistortion coefficients as the weighed combination of at least some of pre-determined sets of digital predistortion coefficients may include deriving weight coefficients applied to the at least some pre-determined sets of digital predistortion coefficients based on minimization procedure applied to the observed output signal and the input signal.

The pre-determined sets of digital predistortion coefficients may be arranged into M records in a data structure, each of the M records comprising K digital predistortion coefficients, with M being a number of the early sets of operating conditions for the power amplification system.

The data structure may be representative of a K×M matrix, L.

The earlier applied calibration procedure may include, for each set of digital predistortion coefficients associated with a particular one of the early sets of operating conditions, obtaining N signal measurements of at least one early output signal of the transmit chain, resulting from at least one earlier input signal, at substantially equal frequency steps, such that the calibrated frequency bandwidth equals approximately the transmit chain bandwidth, with N being computed according to:

$$N = \left\lceil \frac{BW_{TX}}{BW_{RX}} \right\rceil_{CEIL},$$

where $BW_{TX}$ may be the transmit chain bandwidth, and $BW_{RX}$ may be the receive bandwidth of the observation receiver.

Obtaining the N signal measurements of the at least one early output signal may include performing N adjustments of a receiver oscillation frequency, $LO_{RX}$, generated by a local oscillator of the observation receiver, and, at each of the N adjustments of the receiver oscillation frequency, measuring a respective one of the multiple frequency segments of the at least one early output signal.

Performing the N adjustments of the receiver oscillation frequency may include adjusting the receiver oscillation frequency according to:

$$LO_{RX} = LO_{TX} - \left\lceil \frac{BW_{TX}}{2} \right\rceil_{CEIL} + (n-1) \times BW_{RX},$$
$$\forall \in 1, 2, \ldots N,$$

with $LO_{TX}$ being a transmit oscillation frequency of a transmit chain local oscillator.

Measuring the respective one of the multiple frequency segments of the at least one early output signal may include subsampling a measured signal, observed with the observation receiver, of the at least one early output signal to produce a resultant subsampled signal having a spectral representation that is a folded copy of an original spectral representation of the measured signal.

The observation receiver may include a local oscillator operating at a fixed local frequency, and may be implemented without an anti-aliasing filter.

In some variations, a calibration system for digital predistortion is provided. The calibration system includes a signal measurement circuit configured to apply at least one input signal to a power amplification circuit, comprising a transmit chain with at least a power amplifier that produces output with non-linear distortions, to produce at least one output signal, and measure at least one observed signal of the at least one output signal using an observation receiver coupled to an output of the transmit chain of the power amplification system. The observation receiver has a receive bandwidth smaller than a transmit chain bandwidth of the transmit chain, with the signal measurement circuit being configured to measure the at least one observed signal configured to measure multiple frequency segments of the at least one output signal. The calibration system further includes a processor configured to determine one or more sets of digital predistortion coefficients controlling operations of a digital predistorter applied to signals inputted to the transmit chain based, at least in part, on the measured multiple frequency segments of the at least one output signal. Each of the one or more sets of digital predistortion coefficients is associated with a respective one of one or more sets of operating conditions of the power amplification system.

In some variations, a digital predistorter includes an observation receiver of a power amplification system comprising a transmit chain with at least a power amplifier that produces output with non-linear distortions, the observation receiver configured to measure an observed output signal resulting from an input signal provided to the transmit chain, the observation receiver having a receive bandwidth smaller than a transmit chain bandwidth of the transmit chain, with the observed output signal being associated with an observed output signal bandwidth. The digital predistorter further includes an adaptation module configured to determine digital predistortion coefficients. These digital predistortion coefficients are a weighed combination of at least some of pre-determined sets of digital predistortion coefficients computed according to an earlier applied calibration procedure associated with a calibration frequency bandwidth for measuring early output signals of the transmit chain resulting from application of respective early input signals during respective early sets of operating conditions for the power amplification system, the calibration frequency bandwidth being larger than the observed output signal bandwidth.

In some variations, a system is provided that is configured to perform one or more of the method steps provided above.

In some variations, a design structure is provided that is encoded on a non-transitory machine-readable medium, with the design structure including elements that, when processed in a computer-aided design system, generate a machine-executable representation of one or more of the system or digital predistorter modules described above.

In some variations, an integrated circuit definition dataset that, when processed in an integrated circuit manufacturing system, configures the integrated circuit manufacturing system to manufacture one or more of the system modules described above, or the digital predistorter described above.

In some variations, a non-transitory computer readable media is provided that is programmed with a set of computer instructions executable on a processor that, when executed, cause the operations comprising the various method steps described above.

In some variations, a design structure is provided that is encoded on a non-transitory machine-readable medium, with the design structure including elements that, when processed in a computer-aided design system, generate a machine-executable representation of a linearization system that includes an input stage circuit to apply at least one input signal to a power amplification system, comprising a transmit chain with at least a power amplifier that produces output with non-linear distortions, to produce at least one output signal, and a measuring circuit to measure at least one observed signal of the at least one output signal using an observation receiver coupled to an output of the transmit chain of the power amplification system, the observation receiver having a receive bandwidth smaller than a transmit chain bandwidth of the transmit chain, with the measuring circuit configured to measure the at least one observed signal being configured to measure multiple frequency segments of the at least one output signal. The representation of the linearization system further includes a control circuit to determine one or more sets of digital predistortion coefficients controlling operations of a digital predistorter applied to signals inputted to the transmit chain based, at least in part, on the measured multiple frequency segments of the at least one output signal, with each of the one or more sets of digital predistortion coefficients being associated with a respective one of one or more sets of operating conditions of the power amplification system.

Embodiments of the systems, the design structures, the integrated circuit definition datasets, the computer-readable media, and all other implementation described herein, may include at least some of the features described in the present disclosure, including at least some of the features described above in relation to the methods and the systems.

Other features and advantages of the invention are apparent from the following description, and from the claims.

DESCRIPTION OF DRAWINGS

These and other aspects will now be described in detail with reference to the following drawings.

Like reference symbols in the various drawings indicate like elements.

DESCRIPTION

Figure 1:
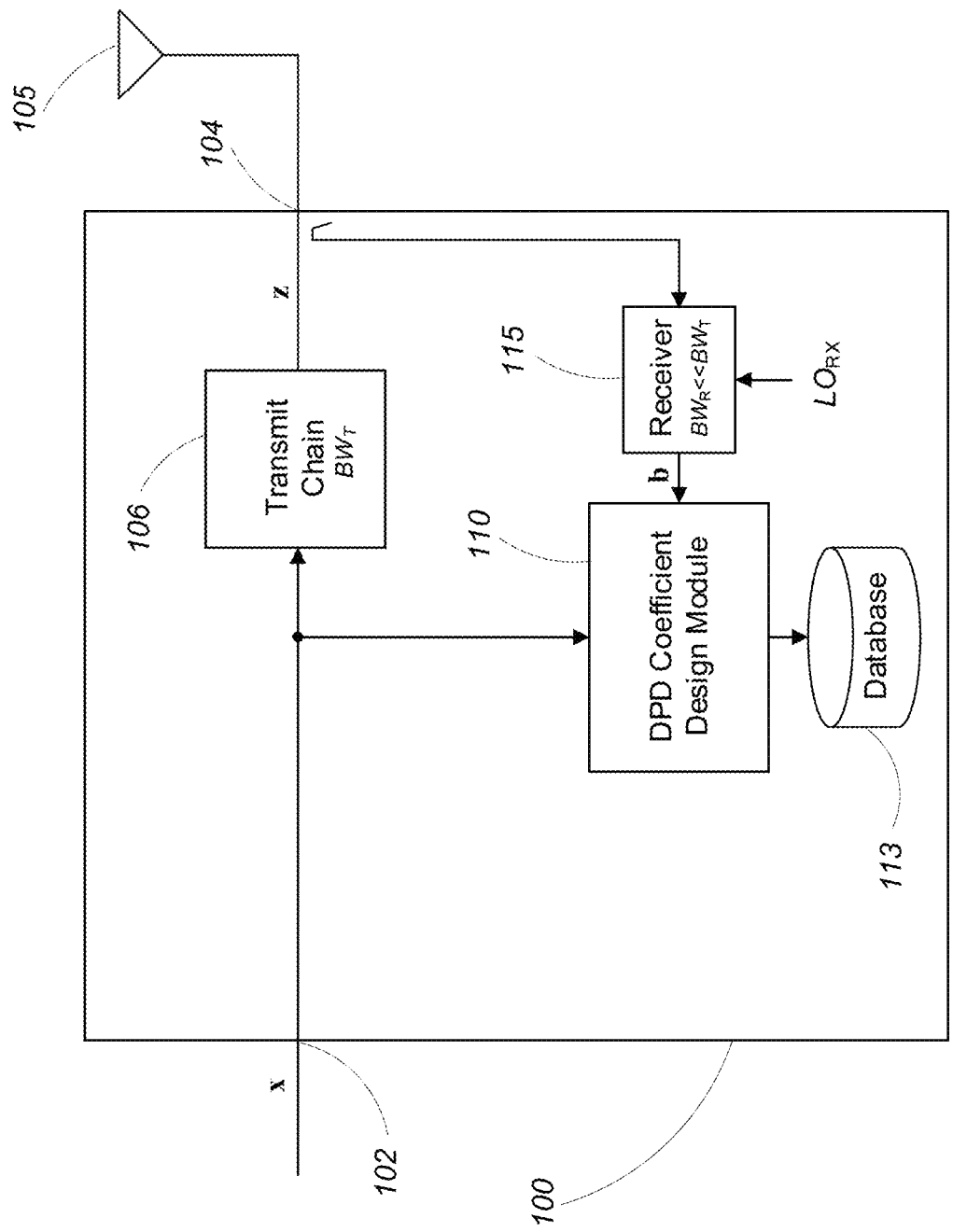
FIG. 1 is a schematic diagram of a calibration configuration of a linearization system.

Disclosed herein are systems, methods, devices, apparatus, media, design structures, integrated circuit definition datasets, and other implementations for digital predistortion (DPD) realized based on incomplete or partial information. For example, realization of the DPD in the implementations described herein may be performed when the receiver bandwidth (e.g., for an observation receiver used to measure samples of output produced by a device's transmitter chain) is smaller than the bandwidth of the transmitter chain (in some cases, the receiver bandwidth is significantly smaller than the transmitter's bandwidth such that $BW_{RX} \ll BW_{TX}$). In some embodiments, the realized hardware may have the ability to change the local oscillator's frequency of the receiver in order to scan the bandwidth of the transmit chain. The implementations and solutions described herein may include the scanning of the full transmit bandwidth by sweeping the receiver's local oscillator's frequency in steps, and using the measurements (which are representative or correlate to characteristics and information about the channel) to compute DPD coefficients. Through varying of operation conditions and taking frequency sweep measurements of output signals, a database of DPD coefficients (corresponding to respective operation conditions) is constructed. In some embodiments, the computation of DPD coefficients can be implemented through introduction of a regularization coefficient in order to improve robustness (e.g., when performing an optimization procedure, such as one based on a least square minimization process). Subsequently, during runtime, partial/incomplete information of the channel (e.g., obtained through measurements at a fixed LO frequency or at more than one LO frequency) can be used to navigate the database of DPD coefficients (e.g., deriving a set of DPD coefficient as a linear combination of the previously computed sets of DPD coefficients by performing a minimization procedure to derive weight parameters applied to the previously computed sets of DPD coefficients).

Accordingly, some implementations include a method (namely, a calibration method that may be implemented at a target device, or at a remote device, at some earlier time prior to regular runtime operation of the system) for digital predistortion that includes applying at least one input signal to a power amplification system, comprising a transmit chain with at least a power amplifier that produces output with non-linear distortions, to produce at least one output signal. The method further includes measuring at least one observed signal of the at least one output signal using an observation receiver coupled to an output of the transmit chain of the power amplification system, with the observation receiver having a receive bandwidth smaller than a transmit chain bandwidth of the transmit chain, with the measuring the at least one observed signal including measuring multiple frequency segments of the at least one output signal. The method additionally includes determining one or more sets of digital predistortion coefficients controlling operations of a digital predistorter applied to signals inputted to the transmit chain based, at least in part, on the measured multiple frequency segments of the at least one output signal, with each of the one or more sets of digital predistortion coefficients being associated with a respective one of one or more sets of operating conditions of the power amplification system. Examples of such one or more sets of operating conditions of the power amplification system may include one or more of temperature of the power amplification system, output power of the power amplification system, loading conditions for the power amplification system, power supply voltage for the power amplification system, and/or device type for the power amplification system. In some embodiments, measuring the multiple frequency segments may include obtaining signal measurements of the at least one output signal at substantially equal frequency steps covering the transmit chain bandwidth. Such frequency sweeping/scanning may be performed through adjustment of the oscillation frequency of the local oscillator of the observation receiver (to allow the observation receiver to cover the wider bandwidth of the transmit chain).

Other implementations described herein include another method for digital predistortion, generally performed at run time (at a device, such as a network node like an access point or base station, or at a personal mobile device such as a smartphone), that includes measuring, by an observation receiver of a power amplification system comprising a transmit chain with at least a power amplifier that produces output with non-linear distortions, an observed output signal resulting from an input signal provided to the transmit chain, with the observation receiver having a receive bandwidth smaller than a transmit chain bandwidth of the transmit chain, and with the observed output signal being associated with an observed output signal bandwidth. The method further includes determining, based on the observed output signal, digital predistortion coefficients, to be applied to input signals provided to the transmit chain, as a weighed combination (e.g., a weighted linear combination, or a weighted non-linear combination) of at least some (and in some situations all) of the pre-determined sets of digital predistortion coefficients computed according to an earlier applied calibration procedure associated with a calibration frequency bandwidth for measuring early output signals of the transmit chain resulting from application of respective early input signals during respective early sets of operating conditions for the power amplification system, with the calibration frequency bandwidth being larger than the observed output signal bandwidth. In some embodiments, determining, based on the observed output signal, the digital predistortion coefficients as the weighed combination of the at least some of the pre-determined sets of digital predistortion coefficients may include deriving weight coefficients applied to the pre-determined sets of digital predistortion coefficients based on a minimization procedure applied to the observed output signal and the input signal. In some examples, the earlier applied calibration procedure may include, for each set of digital predistortion coefficients associated with a particular one of the early sets of operating conditions, obtaining N signal measurements of at least one early output signal of the transmit chain, resulting from at least one earlier input signal, at the substantially equal frequency steps, such that the calibrated frequency bandwidth equals approximately the transmit chain bandwidth, with N being computed according to $N = \lceil BW_{TX}/BW_{RX} \rceil_{CEIL}$, with $BW_{TX}$ being the transmit chain bandwidth, and $BW_{RX}$ being the receive bandwidth of the observation receiver.

Also disclosed herein is a calibration system for digital predistortion. The calibration system includes a circuit to apply input signal to a power amplification circuit (comprising a transmit chain with at least a power amplifier that produces output with non-linear distortions) and measure the observed signal of the at least one output signal using an observation receiver coupled to an output of the transmit chain of the power amplification system. The observation receiver has a receive bandwidth smaller than a transmit chain bandwidth of the transmit chain. The measurement circuit is configured to measure multiple frequency segments of the observed signal. The calibration system further includes a processor configured to determine one or more sets of digital predistortion coefficients controlling operations of a digital predistorter. Each of the one or more sets of digital predistortion coefficients is associated with a respective one of one or more sets of operating conditions of the power amplification system.

In another example implementation, a digital predistorter is provided that includes an observation receiver of a power amplification system (comprising a transmit chain with at least a power amplifier that produces output with non-linear distortions). The observation receiver is configured to measure an observed output signal resulting from an input signal provided to the transmit chain, the observation receiver having a receive bandwidth smaller than a transmit chain bandwidth of the transmit chain. The observed output signal is associated with an observed output signal bandwidth. The DPD further includes an adaptation module configured to determine DPD coefficients. These DPD coefficients are a weighed combination of at least some of pre-determined sets of DPD coefficients computed according to an earlier applied calibration procedure associated that used a calibration frequency bandwidth larger than the observed output signal bandwidth.

Thus, with reference to FIG. 1, a diagram of a calibration configuration of a linearization system 100 is shown that includes an input 102 for receiving an input signal, x, and an output 104 for providing an output signal, z to an antenna 105. The system 100 includes a transmit chain 106, a receiver 115, DPD coefficient design module 110, and a database 113 of DPD coefficient designs. In general, the transmit chain 106 includes a power amplifier and possibly other nonlinear components and therefore has a nonlinear input/output power characteristic. During a calibration phase using the calibration configuration, a number of different operating points, for example, with different operating temperatures, output powers, coding approaches, load conditions, etc., are used to determine corresponding digital predistortion (DPD) parameters or coefficients a for those operating points. For example, the operating points may be the extreme "corner" conditions that the transmit chain is expected to operate in.

When the input signal, x is provided to the transmit chain 106, the transmit chain 106 generates an output signal, z as an amplified version of the input signal, x. In general, the output signal, z includes nonlinear distortion due to the nonlinear input/output power characteristic of the transmit chain 106.

The DPD coefficient design module 110 processes the input signal, x and a sensed version of the output signal, $b \propto z$ to determine a set of K coefficients, a, which when used by a digital predistorter (DPD) to "predistort" the input signal, x to generate a version of the input signal that includes an "inverse nonlinear distortion" (i.e., an inverse of the nonlinear distortion introduced by the transmit chain 106), such that the nonlinear distortions introduced by the transmit chain 106 are substantially cancelled by the inverse nonlinear distortion.

One approach to determining the set of coefficients is to determine coefficients of a predictor (P) that predicts a batch of the output, b (with the time samples forming a vector) from the corresponding batch of input x. That is, the predictor approximates the non-linear system that is being linearized. In such embodiments, the predictor makes use of a set of non-linear functions $f_i(\cdot)$, referred to herein as basis functions, of the input. In particular, K such basis functions are computed from x and arranged as columns of a matrix A. In some implementations, the coefficients of the pre-distorter are scale factors for the basis functions such that:

$$\hat{b} = \sum_i \alpha_i f_i(x) = A\alpha.$$

Therefore, the coefficients can be selected to minimize $$\|\hat{b}-b\| = \|A\alpha - b\|$$

over possible values of $\alpha$. One way to find the best coefficients is as $$\alpha = A^+ b$$

where $$A^+ = (A^H A)^{-1} A^H b.$$

Having determined the coefficients of the predictor, the DPD can be configured to essentially approximate the inverse using the same basis functions. For example, if $$\hat{b} = \sum_i \alpha_i f_i(x),$$

then $$y = 2x - \sum_i \alpha_i f_i(x).$$

As noted, in some examples, the bandwidth of the transmit chain ($BW_{TX}$) is much greater than the bandwidth of the receiver 115 ($BW_{RX}$). In order to achieve a set of DPD coefficients that represent the entire bandwidth of the transmit chain, the oscillator frequency $LO_{RX}$ of the receiver 115 is swept over the bandwidth of the transmit chain in steps as it measures the sensed version of the output signal, b. The sensed version of the output signal, b for all of the steps are combined in the DPDs coefficient design module 110 to determine the set of K coefficients, a, that represent the entire bandwidth of the transmit chain.

In some embodiments, to improve the robustness of the derived sets of DPD coefficients (associated with the different operating points), a modified minimization procedure (to derive the separate sets of DPD coefficients) is used. It includes the introduction of a regularization coefficient $\rho$. Particularly, one implementation of a minimization procedure to compute the DPD coefficients for a particular operating point may be represented as follows:

$$x_0 = \operatorname{argmin}(\|Ax - b\|)$$

In the above relationship, $x_0$ is a resultant vector of optimal coefficients (for the particular operating point), and b are the observed outputs of the transmitter chain. As noted, because the observer receiver's bandwidth is generally smaller (and in some embodiments, substantially smaller) than the transmitter chain's bandwidth, scanning of an output signal over multiple frequency segments of the output is performed. In the modified minimization procedure used to compute the optimal DPD coefficients/parameters for the particular operating point, the minimization problem is presented as follows:

$$x_{OR} = \text{argmin}(\|Ax-b\|+\rho\|x\|)$$

where $\rho$ is a regularization coefficient, and $x_{OR}$ is a vector of optimal coefficients with regularization. Generally, a higher value $\rho$ improves the robustness of the solution (although, potentially, at the cost of accuracy).

As noted above, certain factors such as temperature, output power, power amplifier load, power supply voltage, the particular device being used, coding approaches used, etc., are sometimes collectively referred to as the operating point of the system. The operating point of the system may alter the nonlinearity of the transmit chain 106 and therefore results in the DPD coefficient design module 110 determining a different set of K coefficients. While operating in the calibration configuration, the system 100 cycles through M operating points and derives a set of K DPD coefficients for each operating point. In some examples, the set of K DPD coefficients are determined according to a least mean square minimization problem. The sets of K DPD coefficients associated with the of operating points are stored in the database 113 of DPD coefficient designs. In some examples, the database 113 includes a data structure with M records (corresponding to M different operating points (each corresponding to a set of operating conditions that includes such characteristics as temperature, loading condition, power conditions, voltage/current conditions, etc., used to derive the DPD coefficients) that each includes K coefficients. The data structure may be arranged as a K row by M column matrix, L.

Figure 2:
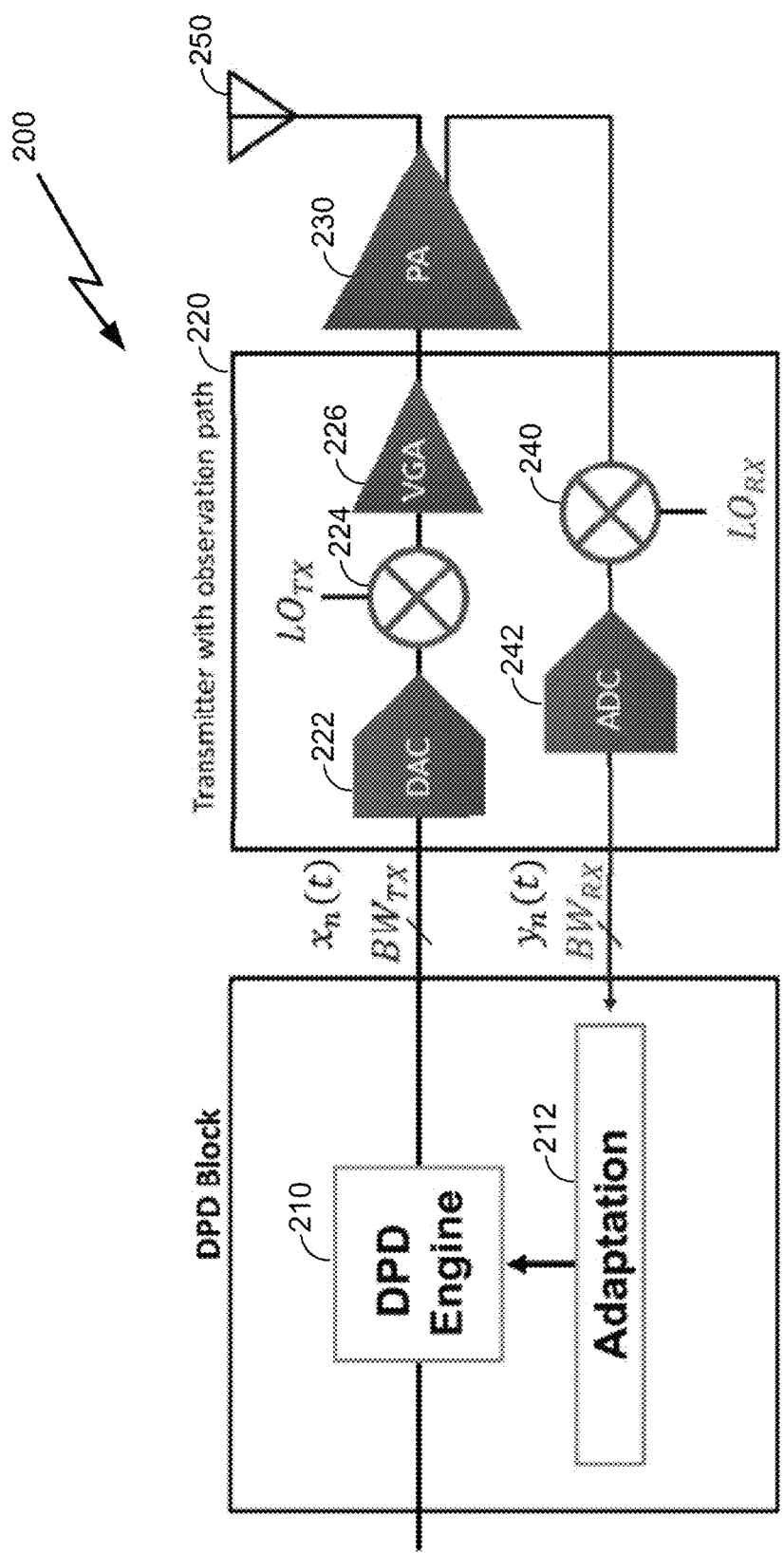
FIG. 2 is a schematic diagram of a digital predistortion system, which may be used for performance of calibration or runtime processes.

FIG. 2 is another schematic diagram representing a digital predistortion system 200, which may be similar to the system implementation 100 depicted in FIG. 1, and shows some additional details of such example implementations. For instance, block 220 of the system 200 includes a schematic representation of the transmitter chain and observation path of the system 200 (which may be similar to the system 100). A DPD engine 210 is configured to perform digital predistortion processing on digital signals provided to the engine 210, e.g., to apply an interpolated set of a linear combination of multiple sets of DPD coefficients, with the weights of the linear combination determined based on a partial observation of an output signal of the system 200. That linear combination of coefficients (computed through an adaptation unit 212 that may include the database of coefficients derived during the calibration stage) may correspond to the coefficients of the basis functions constituting the predistortion functions applied to the input digital signal. The resultant predistorted signal (denoted $x_n(t)$) is provided to a digital-to-analog converter (e.g., DAC) 222 of the block 220, which is coupled, at the DAC's output, to a frequency modulator/multiplier 224 (e.g., a local oscillator, denoted $LO_{TX}$) that in turn is coupled to a variable gain amplifier (VGA) 226. The output signal of the circuitry comprising the DAC 222, the $LO_{TX}$ 224 and the VGA 226 results in an analog predistorted signal. That predistorted analog signal is provided to a power amplifier 230 (which is also part of the transmit chain) to produce amplified output signals that are then transmitted (e.g., optionally after being filtered by output stage filtering circuitry, not shown, which may include a bandpass filter to remove any unwanted harmonics or other signal noise) via antenna(s) 250.

As also shown in FIG. 2, the block 220 includes the observation path circuitry to measure the output signal(s) produced by the PA 230 to facilitate performance of the calibration procedures described herein (i.e., derive sets of coefficients corresponding to respective operating conditions) and/or to compute a linear combination of the previously derived sets of DPD coefficients based on limited measurements (e.g., a single measurement at a fixed LO frequency). The observation path circuitry includes a frequency demodulator/multiplier 240 (e.g., a frequency oscillator denoted as $LO_{RX}$) whose output is coupled to an analog-to-digital converter (e.g., ADC 242) to produce the digital samples used in the DPD adaptation process (either for calibrations operations or for runtime computation of weights to produce a linear combination of DPD coefficient sets). Although not specifically shown in FIG. 2, in some embodiments, an anti-aliasing filter may be coupled to the output of the frequency multiplier 240.

Figure 3:
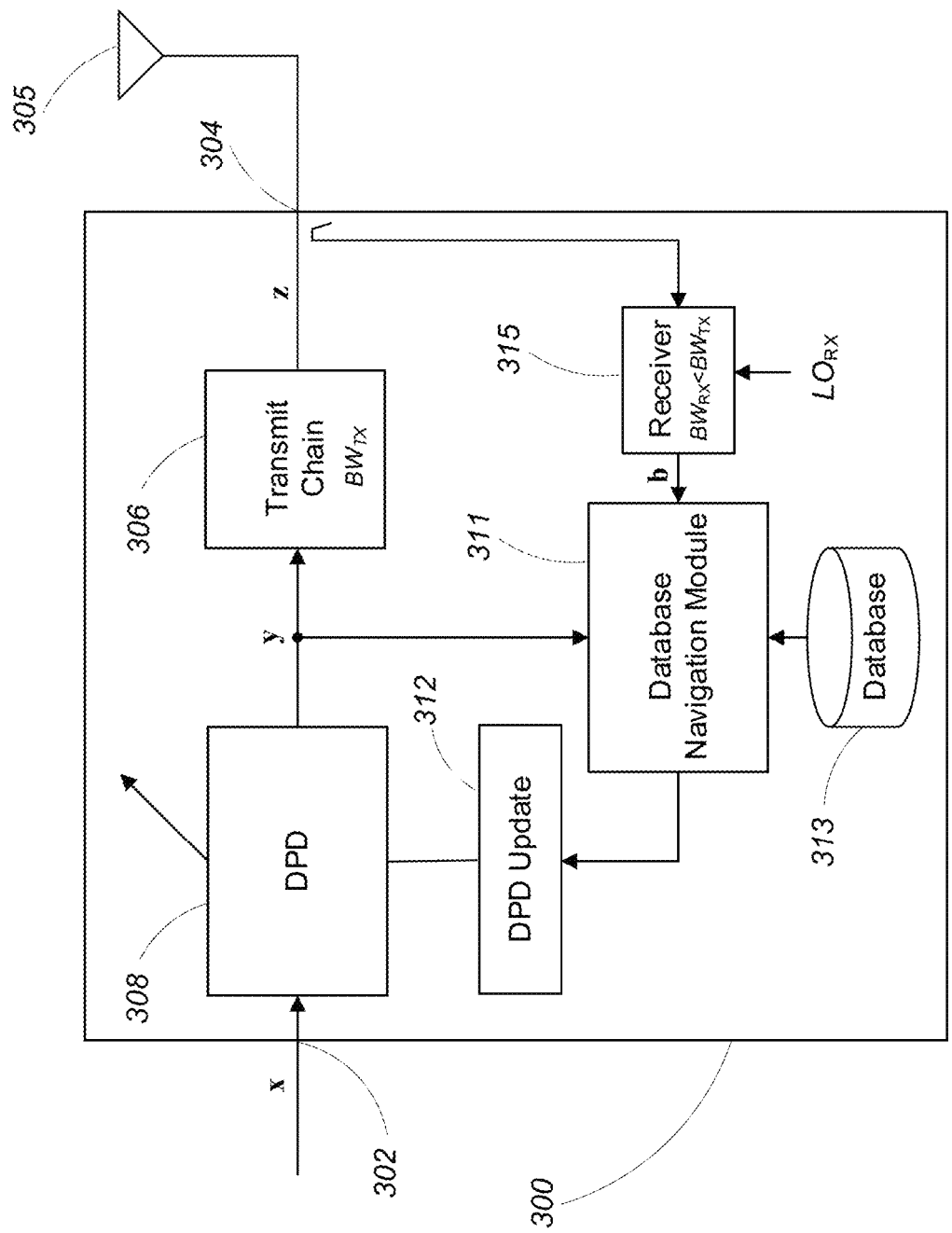
FIG. 3 is schematic diagram of a runtime configuration of a linearization system.

Referring to FIG. 3, a schematic diagram of another example system 300, which may be similar to the systems 100 or 200 of FIGS. 1 and 2, and which may be configured to implement the runtime configuration of the procedures described herein is shown (the implementation depicted in FIG. 3 may also be configured to realize the calibration procedures described herein). The system 300 includes an input 302 for receiving an input signal, x and an output 304 for providing an output signal, z to an antenna 305. The system 300 includes the transmit chain 306, the receiver, a digital predistorter (DPD) 308, a DPD update module 312, a database navigation module 311, and the database 313.

As noted, without compensation, the output signal, z would not be an accurate amplified reproduction of the input signal, x. The system 300 includes the DPD 308 to compensate for the nonlinear distortion introduced by the transmit chain 306. In particular, the DPD 308 receives the input signal, x and predistorts the signal to generate an intermediate input signal, y. Ideally, the intermediate input signal, y includes an inverse nonlinear distortion (i.e., an inverse of the nonlinear distortion introduced by the transmit chain 306), such that the nonlinear distortion introduced by the transmit chain 306 is substantially cancelled by the inverse nonlinear distortion. The output signal, z is therefore substantially free of nonlinear distortion.

In some examples, the DPD 308 operates according to an inverse model of the nonlinear distortion of the transmit chain 306 such that providing the input signal, x to the DPD 108 causes the DPD 108 to generate the intermediate input signal, y as follows:

$$y = 2x = \sum_{i}^{n} a_i f_i(x)$$

where $f_i(\cdot)$ is the $i^{th}$ basis function of n basis functions of a model of the nonlinearity of the transmit chain 306 and $a_i$ is the $i^{th}$ parameter (e.g., the $i^{th}$ weight) corresponding to the $i^{th}$ basis function.

In general, the nonlinear input/output characteristic of the transmit chain 306 may change over time. The parameters, a used by the DPD 308 to generate the intermediate input signal, y therefore need to be updated reflect the changes in the nonlinear input/output characteristic of the transmit chain 306.

During runtime, one way to compute the coefficients/parameters is to estimate them directly using what is essentially a subsampled version of b, denoted $\tilde{b}$, and using similarly subsampled basis functions, $\tilde{f}_i(\cdot)$ and the combined matrix $\tilde{A}$, and solve for the predictor coefficients to minimize $\|\tilde{A}\alpha - \tilde{b}\|$. However, because the minimization of this quantity does not take into account the frequency ranges not represented in the subsampled signals, the coefficients of the predictor may yield unacceptable distortion outside the subsampled bandwidth.

Rather than determining the DPD coefficients directly via a minimization, an alternative approach is to find a weighted combination of the sets of DPD coefficients/parameters that were previously determined for various operating conditions. As described herein, the predetermined DPD coefficients may have been determined at a remote device that can emulate, model, or otherwise approximate the linearization system 300, or they may have been computed at the target device (be it a network node or a personal device).

The sensed (subsampled) version of the output signal, $\tilde{b}$ is provided to the database navigation module 311 which includes a set of DPD coefficients that are most appropriate for the total transmit chain bandwidth, $BW_T$, by inferring an operating point of the transmit chain, from the sensed version of the output signal, $\tilde{b}$, as a combination of the previously considered operating points.

The database navigation module 111 determines an updated set of coefficients, $\alpha$ by finding coefficients of a predictor as a linear combination of the columns of the matrix L as $$\alpha = L\beta$$

where $\beta$ is an M dimensional vector of real-valued operating point weights. The best choice of the operating point weights can be found by minimizing $$\|\hat{b} - b\| = \|\tilde{A}L\beta - \alpha - b\|,$$

which may be computed as:

$$\beta = (\tilde{A}L)^+ \tilde{b};$$

This in turn yields $$\alpha = L\beta = L(\tilde{A}L)^+ \tilde{b} = L(L^H \tilde{A}^H \tilde{A} L))^{-1} (\tilde{A}L)^H \tilde{b}.$$

The compensator coefficients are provided to the DPD update module 312, which reconfigures the DPD 308 as the inverse (or approximate inverse) of the predictor.

Thus, in such embodiments, based on a limited observation (subsampled) of the output signal (observed at a fixed frequency, or at a number of frequencies, with the number being less than the number of frequencies used to sweep the transmit chain during the calibration procedure), weights that are to be applied to the M sets (or to some subset of M) of DPD coefficients (which may correspond to M columns of a matrix L) are derived in order to generate the resultant linear combination of the sets of DPD coefficients that is provided the DPD engine. That linear combination corresponds, in effect, to an inferred operating condition corresponding to the operating points associated with the respective M sets of DPD coefficients (environmental and channel properties associated with the inferred operating point may or may not be computed, depending on whether data representative of such environmental and channel properties is maintained, and whether the inferred values are needed for further processing).

In some examples, not all the sets of coefficients of L are retained. For example, sets of coefficients that are linear combinations of other sets (or close to linear combinations of sets) can be omitted. One way to reduce the number of columns of L from M to $\tilde{M} \ll M$, thus reducing (using, for example, a singular value decomposition (SVD) procedure) the dimension of $\beta$ to be estimated from the subsampled signal, is to perform a low-rank approximation of L to yield $\tilde{L}$ corresponding to the $\tilde{M}$ largest singular values of L. Then, the $\tilde{M}$ coefficients are found as $$\beta = (\tilde{A}\tilde{L})^+ \tilde{b};$$

Figure 4:
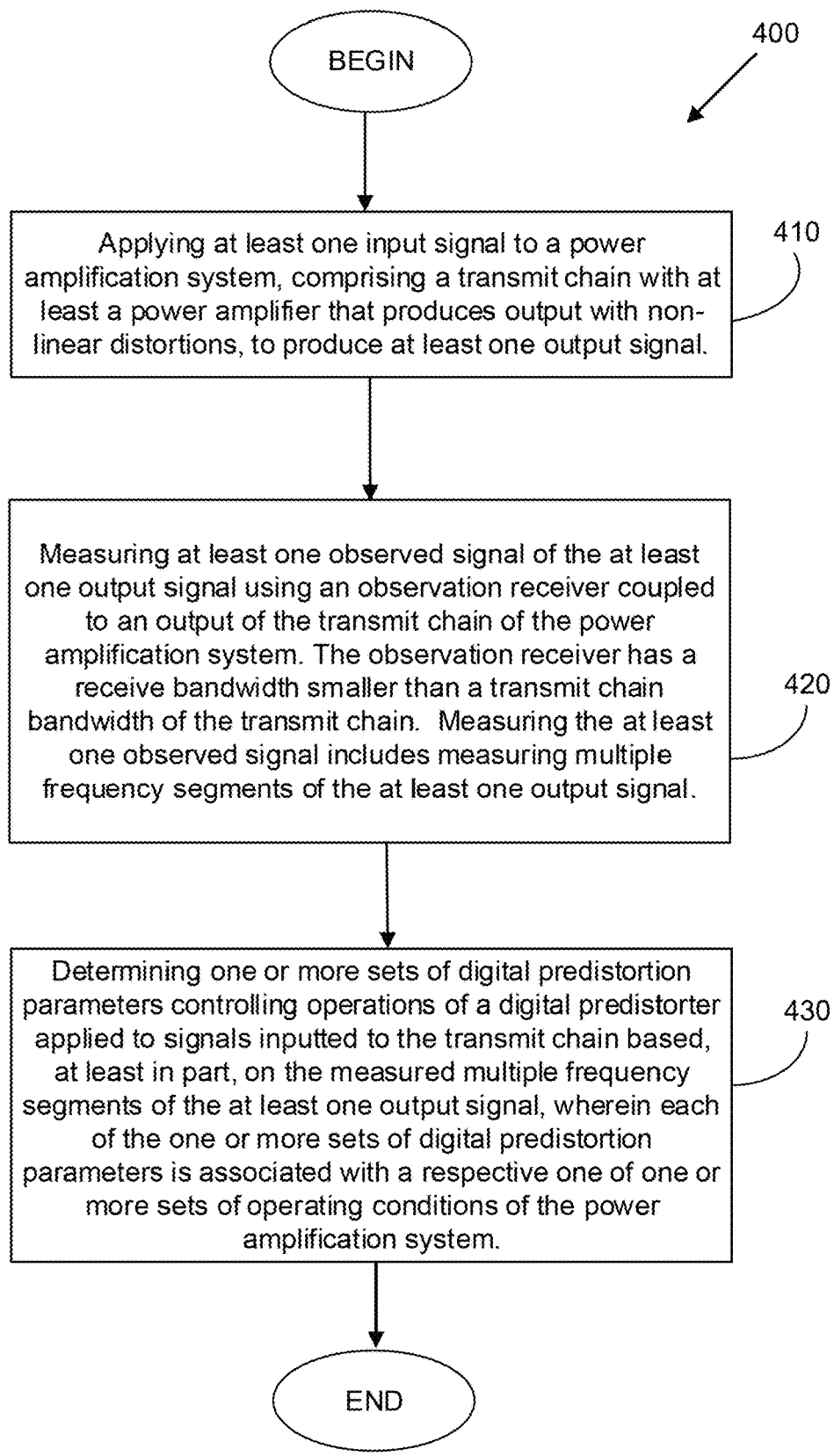
FIG. 4 is a flowchart of an example calibration procedure for digital predistortion.

With reference next to FIG. 4, a flowchart of an example calibration procedure 400 for digital predistortion, which may be performed at a remote device different from the target device at which the companion runtime procedure is implemented (be it at a network node or a personal mobile device) is shown. The procedure 400 includes applying 410 at least one input signal to a power amplification system (such as those included with the systems 100, 200, or 300 of FIGS. 1-3), comprising a transmit chain (e.g., the transmit chain 106 of FIG. 1, the transmit chain of the block 220 of FIG. 2, etc.) with at least a power amplifier that produces output with non-linear distortions, to produce at least one output signal.

The procedure 400 further includes measuring 420 at least one observed signal of the at least one output signal using an observation receiver coupled to an output of the transmit chain of the power amplification system (e.g., generally the output of the power amplifier), with the observation receiver having a receive bandwidth smaller than a transmit chain bandwidth of the transmit chain, and with measuring the at least one observed signal including measuring multiple frequency segments of the at least one output signal. As described herein, the measuring of the observed output signal, by the observation receiver, may be performed by scanning the frequency range of the transmitter chain bandwidth. For example, measuring the multiple frequency segments may include obtaining signal measurements of the at least one output signal at substantially equal frequency steps covering the transmit chain bandwidth. In such embodiments, obtaining the signal measurements of the at least one output signal at the substantially equal frequency steps may include obtaining N signal measurements of the at least one output signal at the substantially equal frequency steps, with N being computed according to:

$$N = \left\lceil \frac{BW_{TX}}{BW_{RX}} \right\rceil_{CEIL}$$

In the above relationship, $BW_{TX}$ is the transmit chain bandwidth, and $BW_{RX}$ is the receive bandwidth of the observation receiver. Obtaining the N signal measurements may include performing N adjustments of a receiver oscillation frequency, $LO_{RX}$, generated by a local oscillator of the observation receiver, and at each of the N adjustments of the receiver oscillation frequency, measuring a respective one of the multiple frequency segments of the at least one output signal. For example, performing the N adjustment of the receiver oscillation frequency may include adjusting the receiver oscillation frequency according to:

$$LO_{RX} = LO_{TX} - \left\lceil \frac{BW_{TX}}{2} \right\rceil_{CEIL} + (n-1) \times BW_{RX},$$

$$\forall \in 1, 2, \ldots N,$$

Figure 5:
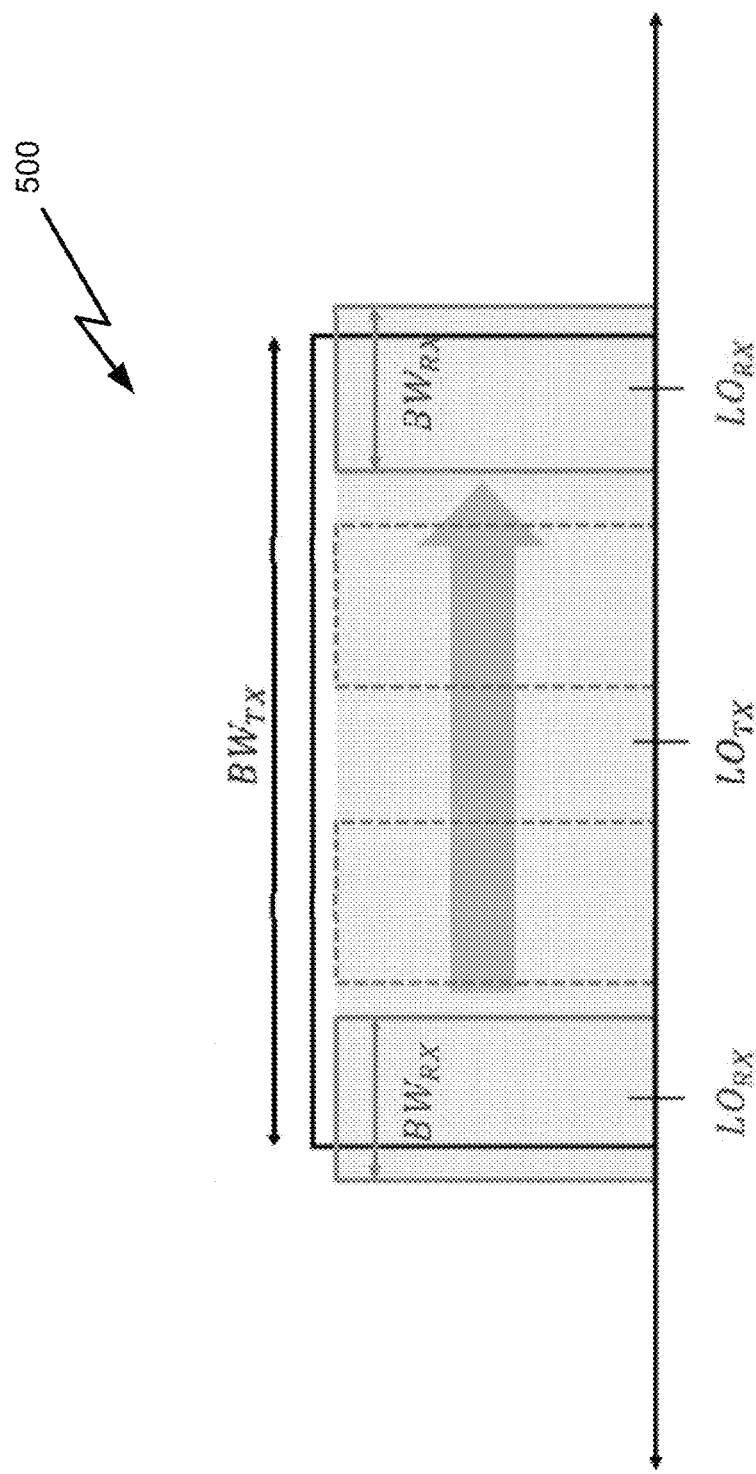
FIG. 5 is a diagram illustrating the scanning of a transmitter chain bandwidth through adjustments of an observation receiver local oscillator ($LO_{RX}$).

$LO_{TX}$ in the above relationship is a transmit oscillation frequency of a transmit chain local oscillator. FIG. 5 is a diagram 500 illustrating the scanning of a transmitter chain bandwidth through adjustments of the observation receiver local oscillator ($LO_{RX}$).

Thus, for every scan (to measure the multiple frequency segments of an output signal(s) resulting from providing an input signal(s) to the transmit chain) input and output pairs of waveforms are collected for a given LO frequency step. When the scanning is complete, there are N waveform pairs, that can be denoted as $\{x_n(t), y_n(t), \forall n=1, 2, 3, \ldots, N\}$. These N waveform pairs can be used to compute a digital predistorter using the DPD derivation procedures described herein. For example, for every set of waveform pairs corresponding to an input signal and a corresponding output signal (which may correspond to a particular operating point), an optimization procedure (e.g., based on a least-squares process) may be performed to obtain a set of DPD coefficients/parameters. It is to be noted that in some embodiments, the calibration, or training, system may be configured to obtain several measurements at several different frequency points (e.g., via the use a set of observation receivers operating substantially simultaneously, or a single receiver configured to observe signals at multiple frequency segments), instead of having to individually scan those different point using a single observation receiver (with an adjustable local oscillator). Furthermore, in one such implementation, measurements covering the entire frequency span of the transmit chain may be performed substantially simultaneously.

In some embodiments, instead of using an arrangement that includes an anti-aliasing filter in conjunction with an adjustable observation receiver local oscillator ($LO_{RX}$) (such as the oscillator 240 of FIG. 2), an alternative approach based on subsampling of the observed samples may be used. For example, the observed samples provided to the adaptation unit 212 to perform the DPD optimization process may be obtained through sub-sampling of observed signals output by the transmitter chain (e.g., subsampling of the output of the PA 230 as observed through an arrangement comprising a fixed local oscillator and an ADC such as 242). Performing the subsampling on the observed samples of the output signal of the PA 230 has the effect of folding the spectral representation of the output samples into a narrower spectral window. In such implementations, the observed samples used for the optimization process may have been subsamples at a rate which is some fraction (e.g., ¼) of the original sampling rate of the samples processed by the transmitter chain. For example, in some embodiments the sampling rate for the transmitter chain may be 500 Msps, while the sampling rate for the observed samples (fed back to the adaptation unit to compute DPD coefficients) may be 125 Msps. In some examples, the computation of the DPD coefficients, using the subsampled observed samples may include similar subsampling of the basis functions for which the DPD coefficients are being computed.

Thus, in these alternative embodiments, a linearizer system (such as NanoSemi's Signal Correction Portfolio (NSCP) Linearization Core produced by NanoSemi Inc.) maintains performance for different transmitter and receiver sampling rates when the following conditions are met: 1) the transmit sampling rate is greater than or equal to receiver sampling rate, 2) if the receiver sampling rate is less than the transmitter sampling rate, then anti-aliasing filter in the receiver is disabled (hence, this is equal to sampling at a lower rate by dropping intermediate samples), and 3) it is assumed that the process of removing anti-aliasing filter will still preserve the aliased signals. If assumption #3 is not valid, then a model describing the ADC behavior is available. Accordingly, this means that the linearization system (e.g., the NSCP Linearizer Core) can meet SEM requirement with Tx Sampling Rate=500 Msps, Rx Sampling Rate=125 Msps with anti-aliasing filters disabled.

To illustrate, consider a situation in which the Tx sampling rate is 500 Msps. To achieve an Rx Sampling Rate of 500 Msps, every received sample may be selected (thus, the selected sample index=[0 1 2 3 4 5 6 7 8 9 . . . ]). To achieve an Rx Sampling Rate of 250 Msps, every other sample is selected (i.e., by dropping one sample) from the 500 Msps signal (thus, the selected sample index=[0 2 4 6 8 . . . ]). To achieve an Rx sampling rate of 125 Msps, every 4th sample is selected (i.e., by dropping three samples) from the 500 Msps signal (thus, the selected sample index=[0 4 8 . . . ]). In these implementations, removing anti-aliasing filter is equivalent to dropping samples. This implies that the spectrum is folded in-band without any loss.

Figure 9A:
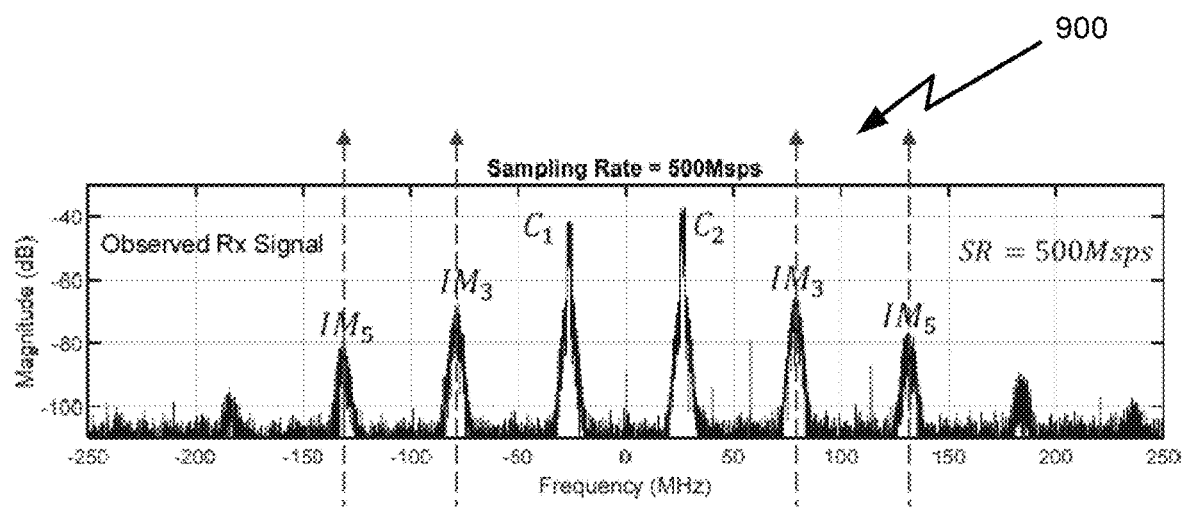
FIGS. 9A-9C are graphs illustrating spectrum folding effects achieved through subsampling of an observed signal produced by a transmit chain of a linearization system.
Figure 9B:
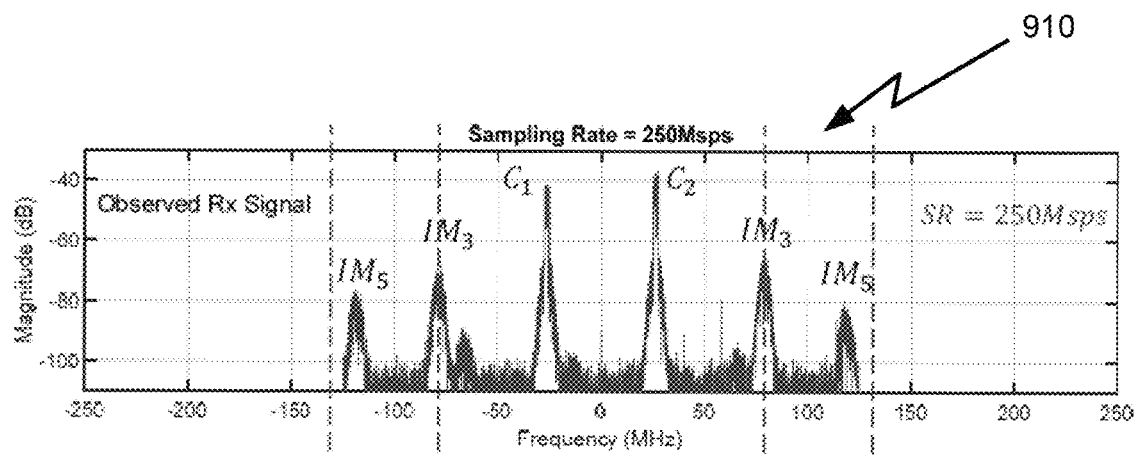
Figure 9C:
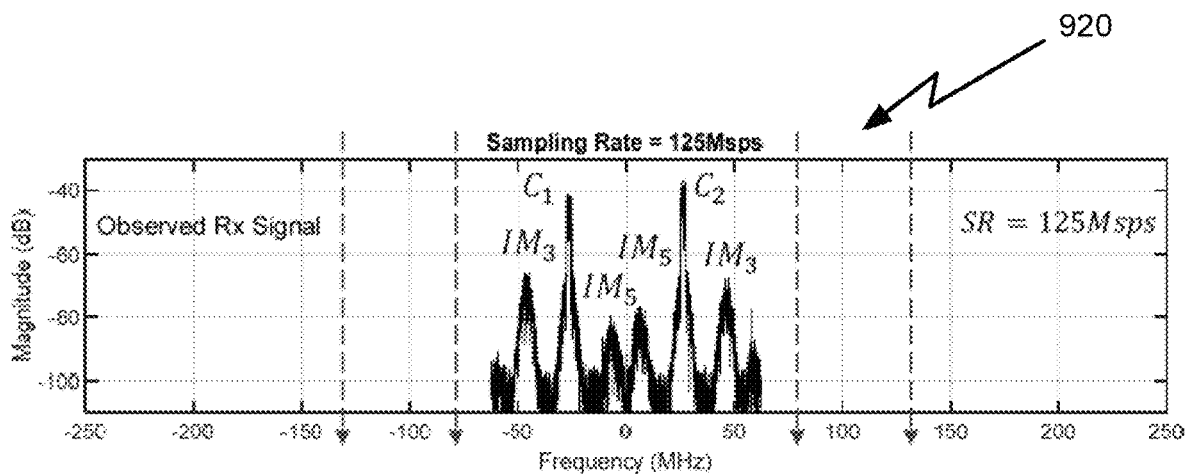
Figure 9D:
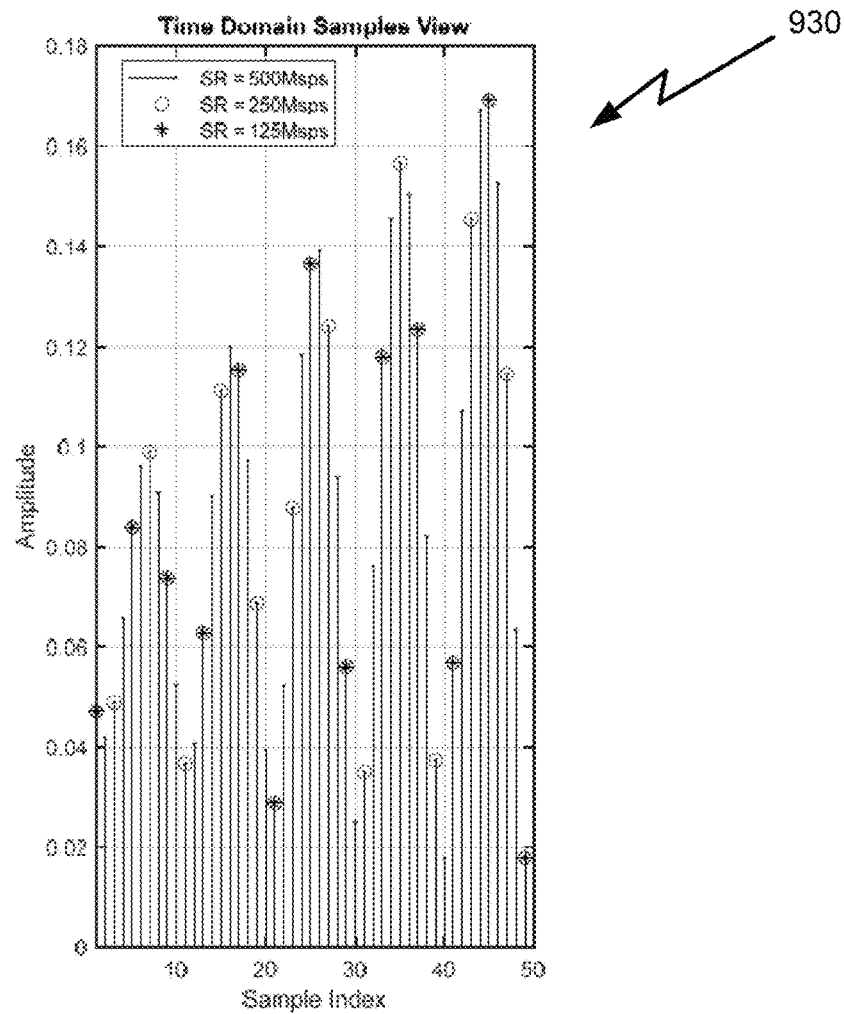
FIG. 9D is a graph showing a time domain representation for a portion of the observed receiver signal whose frequency domain representations are shown in FIGS. 9A-9C.

FIGS. 9A-9C include respective graphs 900, 910, and 920 illustrating the spectrum folding effect achieved through sub sampling, by a receiver of a linearization system (such as any of the linearization systems 100, 200, or 300 of FIGS. 1-3), of an observed signal produced by a transmit chain of the system. Specifically, FIG. 9A illustrates an example frequency domain representation of an observed signal (with main energy portions $C_1$ and $C_2$, and intermodulation (IM) components $IM_3$ and $IM_5$) of the output of the transmit chain when the sampling rate is the same as the sampling rate of the digital signal inputted to the transmit chain. FIG. 9B shows the frequency representation of an observed signal of the same transmit chain output signal, but with the observed receiver signal subsampled at half the rate of the digital signal inputted to the transmit chain (e.g., 250 Msps compared to 500 Msps for the transmitted signal). As can be seen, the spectrum depicted in FIG. 9B is similar to the spectrum depicted in FIG. 9A, but compressed into a narrower bandwidth (the bandwidth in FIG. 9B, extending from $-IM_5$ to $+IM_5$, is approximately −130 MHz to +130 MHz, while in FIG. 9A the bandwidth extends from approximately −140 MHz to +140 MHz). FIG. 9C shows the frequency representation of an observed receiver signal of the same transmit chain output signal (used for FIG. 9A or 9B), but with the observed receiver signal subsampled at a quarter of the rate as that of the digital signal inputted into the transmit chain (e.g., 125 Msps compared to 500 Msps for the transmitted signal). As can be seen, at this subsampled rate of the observed receiver signal, the frequency representation includes the energy portions $IM_5$ located between the energy portions $C_1$ and $C_2$, and thus the frequency representation of the subsampled signal is, in effect, a folded copy of the frequency representation of the observed receiver signal shown in FIG. 9A. FIG. 9D is a graph 930 showing the time domain representation for a portion of the observed receiver signal.

Accordingly, in some embodiments, measuring the multiple frequency segments of the at least one output signal may include subsampling a measured signal observed with the observation receiver of the at least one output signal of the output of the transmit chain to produce a resultant subsampled signal having a spectral representation that is a folded copy of an original spectral representation of the measured signal. The observation receiver may include a local oscillator operating at a fixed local frequency. In some examples, the observation receiver may be implemented without an anti-aliasing filter.

With continued reference to FIG. 4, the procedure 400 further includes determining 430 one or more sets of digital predistortion coefficients controlling operations of a digital predistorter applied to signals inputted to the transmit chain based, at least in part, on the measured multiple frequency segments of the at least one output signal. Each of the one or more sets of digital predistortion coefficients is associated with a respective one of one or more sets of operating conditions of the power amplification system. In some embodiments, determining the one or more sets of digital predistortion coefficients controlling the operations of the digital predistorter may include arranging the determined one or more sets of digital predistortion coefficients into M records in a data structure, with each of the M records including K digital predistortion coefficients, and with M representing a number of the one or more sets of operating conditions. The data structure may be configured to be accessed (e.g., during runtime, when deployed and operating on the target device that is to perform the digital predistortion processing, with the target device including a transmit chain which is the same or similar to the transmit chain used during calibration) to compute digital predistortion coefficients applied to subsequent input signals provided to the transmit chain. The digital predistortion coefficients may be computed as a weighted combination (e.g., weighted linear combination, or weighted non-linear combination) of at least some of the one or more sets of digital predistortion coefficients based on at least one of sensed subsequent outputs of the transmit chain responsive to the subsequent input signals. In some embodiments, arranging the determined one or more sets of digital predistortion coefficients may include arranging the one or more digital predistortion coefficients in a K×M matrix, L. The procedure 400 may further include deriving a reduced size matrix, L', with a reduced number of columns M', with M'<M. For example, deriving the reduced size matrix, L', may include applying a singular value decomposition process on the matrix L to derive the reduced size matrix L'.

As described herein, in some implementations, determining the one or more sets of digital predistortion coefficients may include determining a particular set of digital predistortion coefficients from the one or more sets of digital predistortion coefficients by applying a minimization procedure (e.g., based on a least-squares process, or some other optimization procedure) to derive a set of predictor coefficients that minimize a function applied to a particular one of the at least one input signal and the measured multiple frequency segments of a resultant particular one of the at least one output signal. In some embodiments, in order to make the determined coefficients more robust, a modified regularized minimization procedure may be used to compute the optimal coefficients according to, for example, $$x_{OR} = \operatorname{argmin}(\|Ax-b\|+\rho\|x\|)$$

where $\rho$ is a regularization coefficient, and $x_{OR}$ is a vector of optimal coefficients with regularization.

In some embodiments, the one or more sets of operating conditions of the power amplification system may include one or more of, for example, temperature of the power amplification system, output power of the power amplification system, loading conditions for the power amplification system, power supply voltage for the power amplification system, and/or device type for the power amplification system. Other channel and/or environmental properties/attributes/characteristics may also be used.

Figure 6:
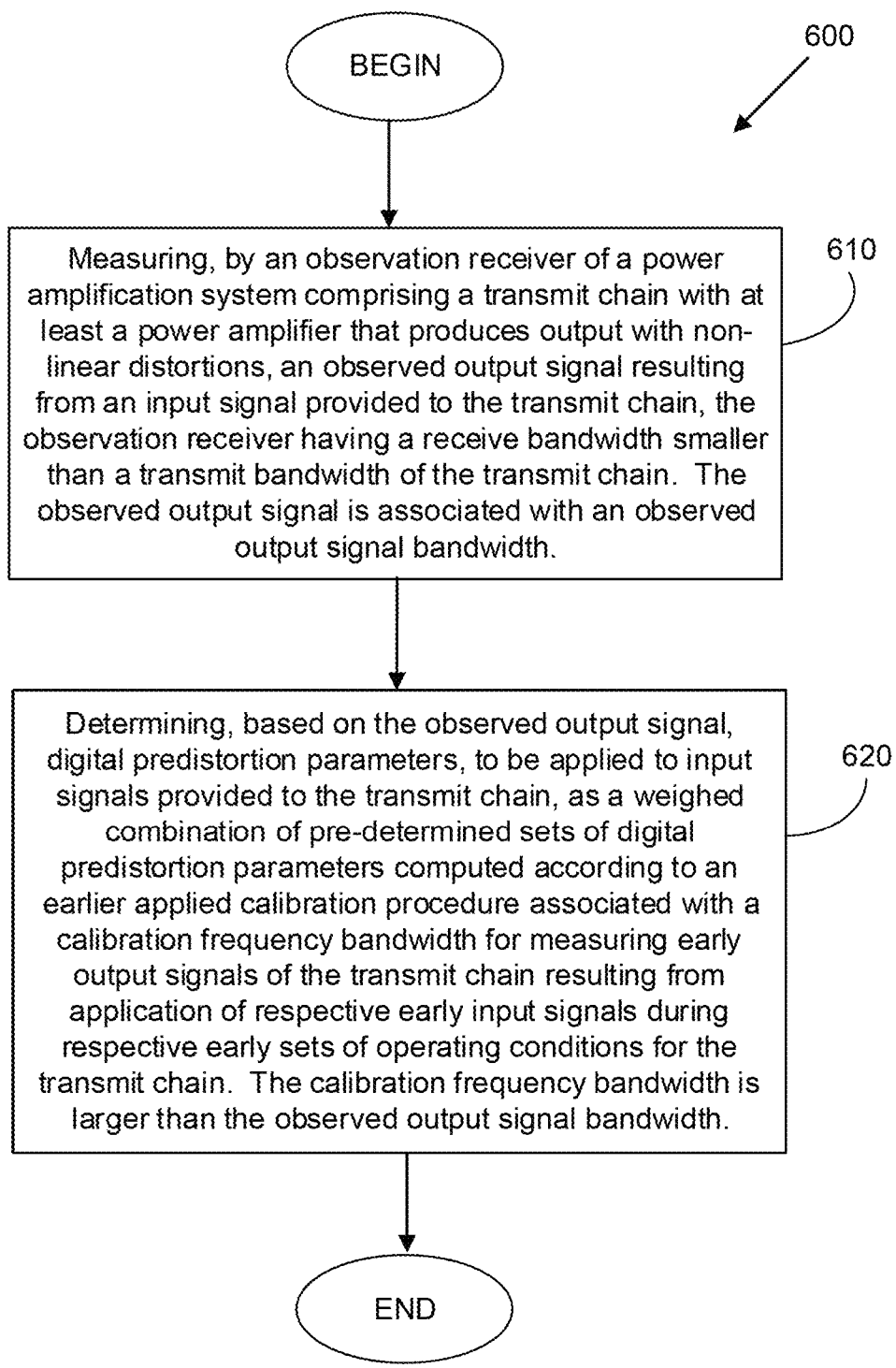
FIG. 6 is a flowchart of an example runtime procedure for digital predistortion.

With reference now to FIG. 6, a flowchart of an example runtime procedure 600 for digital predistortion, which is generally at the target device implementing DPD processing (e.g., a network node, such as an access point or a base station, or a personal mobile device) is shown. The procedure 600 includes measuring 610, by an observation receiver of a power amplification system comprising a transmit chain with at least a power amplifier that produces output with non-linear distortions, an observed output signal resulting from an input signal provided to the transmit chain, with the observation receiver having a receive bandwidth smaller than a transmit bandwidth of the transmit chain, and with the observed output signal being associated with an observed output signal bandwidth. Measuring the observed output signal may be done as a measurement at a fixed local oscillator frequency of the observation receiver (e.g., $LO_{RX}$), or at a number of adjusted frequencies of the local oscillator (although generally the number of adjusted frequency values of the local oscillator may be smaller than the number of adjustments, N, used during the calibration stage to scan/sweep the transmitter chain bandwidth).

The procedure 600 additionally includes determining 620, based on the observed output signal, digital predistortion coefficients, to be applied to input signals provided to the transmit chain, as a weighed linear combination of at least some pre-determined sets of digital predistortion coefficients computed according to an earlier applied calibration procedure associated with a calibration frequency bandwidth for measuring early output signals of the transmit chain resulting from application of respective early input signals during respective early sets of operating conditions for the power amplification system, with the calibration frequency bandwidth being larger than the observed output signal bandwidth (i.e., the bandwidth for measurements obtained during the calibration stage is larger than the observation measurement bandwidth used during runtime, effectively resulting in subsampled runtime signal measurement). In some embodiments, determining, based on the observed output signal, the digital predistortion coefficients as the weighed linear combination of the at least some of the pre-determined sets of digital predistortion coefficients may include deriving weight coefficients applied to the pre-determined sets of digital predistortion coefficients based on minimization procedure applied to the observed output signal and the input signal.

In some examples, the pre-determined sets of digital predistortion coefficients may be arranged into M records in a data structure, with each of the M records comprising K digital predistortion coefficients. M, in such embodiments, is a number of the early sets of operating conditions for the power amplification system. In some embodiments, the data structure may be representative of a K×M matrix, L. The earlier applied calibration procedure (performed on the same power amplification system used at runtime, or on a similar power amplification system, e.g., corresponding to the same device type of other system conditions) may include, for each set of digital predistortion coefficients associated with a particular one of the early sets of operating conditions obtaining N signal measurements of at least one early output signal of the transmit chain, resulting from at least one earlier input signal, at the substantially equal frequency steps, such that the calibrated frequency bandwidth equals approximately the transmit chain bandwidth. N may be computed according to:

$$N = \left\lceil \frac{BW_{TX}}{BW_{RX}} \right\rceil_{CEIL},$$

where $BW_{TX}$ is the transmit chain bandwidth, and $BW_{RX}$ is the receive bandwidth of the observation receiver.

Obtaining the N signal measurements of the at least one early output signal may include performing N adjustments of a receiver oscillation frequency, $LO_{RX}$, generated by a local oscillator of the observation receiver, and, at each of the N adjustments of the receiver oscillation frequency, measuring a respective one of the multiple frequency segments of the at least one early output signal. Performing the N adjustment of the receiver oscillation frequency may include adjusting the receiver oscillation frequency according to:

$$LO_{RX} = LO_{TX} - \left\lceil \frac{BW_{TX}}{2} \right\rceil_{CEIL} + (n-1) \times BW_{RX},$$

$$\forall \in 1, 2, \ldots N,$$

where $LO_{TX}$ is a transmit oscillation frequency of a transmit chain local oscillator. As noted, in some implementations, the calibration system may be configured to obtain several measurements at several different frequency points substantially simultaneously (e.g., via the use a set of observation filters), without having to scan through those different points using an observation receiver with an adjustable local oscillator.

Thus, in some embodiments, during the runtime stage, each record (e.g., column) in a database act as the new basis generator. The runtime procedure implements database navigation operation to find a linear combination of the at least some (or all) of columns of the matrix L (constructed during the calibration stage), that gives a minimal error for current operating condition. An accurate DPD can be implemented in the presence of a database even when the information used is partial or incomplete. For example, a procedure to compute the optimal weight parameters $f$ (that are applied to the sets of DPD coefficients of the database to generate an optimal linear combination thereof that is reflective of a current inferred operating point) including solving the problem:

$$f_0 = \mathrm{argmin}(\|AL \times f - b\|)$$

The new compensator coefficients are represented as $Lf_0$.

Figure 7:
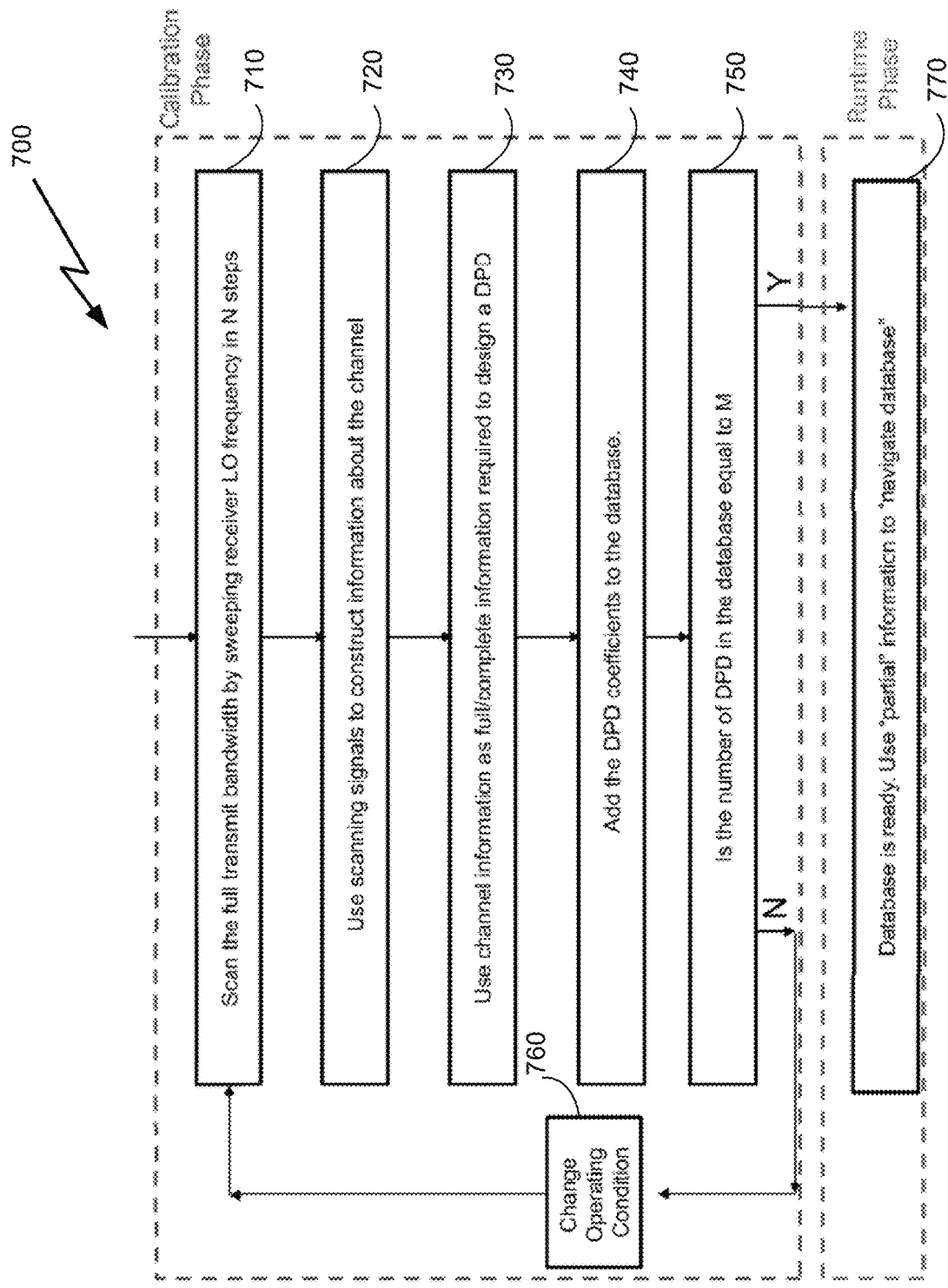
FIG. 7 is a flow diagram of an example procedure for digital predistortion, which includes calibration and runtime processing.

With reference to FIG. 7, a flow diagram of an example procedure 700 for digital pre-distortion is shown. The example procedure 700 includes, in this example, calibration phase (stage) operations (710-760) and runtime phase (stage) operations (770). The calibration phase operations and the runtime phase operation may be performed on the same device (be it a network device, or a personal mobile device), or may be performed at different devices. For example, the calibration phase operations may be performed at a remote server where a DPD navigation database, generated according to, for example, the procedure 400, is constructed, with the navigation database and other implementation components (e.g., hardware or software modules) being communicated to another device where deployment and realization of the navigation database and related modules are performed.

As shown in FIG. 7, the calibration phase operations of the procedure 700 include operations to scan, at 710, the full transmit bandwidth by, for example, sweeping the receiver LO frequency in N steps (which may be equal-size steps or irregular size steps). As discussed herein, the scanning of the transmit bandwidth may be implemented by making N adjustments of the receiver oscillation frequency by adjusting the receiver oscillation frequency according to:

$$LO_{RX} = LO_{TX} - \left\lceil \frac{BW_{TX}}{2} \right\rceil_{CEIL} + (n-1) \times BW_{RX},$$

$$\forall \in 1, 2, \ldots N,$$

with $LO_{TX}$ is a transmit oscillation frequency of a transmit chain local oscillator. Alternatively, an observation receiver at the device performing the calibration or training process may be configured to obtain measurements corresponding to more than one frequency segment of the output signal(s) produced by the transmit chain (e.g., using multiple observation receivers with different local oscillation frequencies and/or different bandwidths)

Subsequently, the scanning signals obtained through the frequency sweep may be used to obtain (and construct) information about the channel (at block 720). More specifically, for a particular operating point (associated with a set of channel and environmental conditions, such as temperature, output power, load conditions, power supply voltage, actual device characteristics, etc.), an input signal $x_n(t)$ is applied to a linearization (i.e., digital predistortion) system such as the systems 100, 200, or 300 depicted in FIGS. 1-3. The input signal (which may be subjected to an initial linearization function as applied by the digital predistorter) results in an output signal (e.g., the signal z depicted in FIGS. 1 and 3) at the output of the transmit chain (of the linearization system). A frequency sweep by the observation receiver (with a local oscillator $LO_{RX}$) provides sampled outputs $y_n(t)$, thus provides N waveform pairs $\{x_n(t), y_n(t), \forall n=1, 2, 3, \ldots, N\}$, that are representative of the particular operating point conditions (e.g., for the same input signal $x_n(t)$, but at a different operating point, a different sampled output signal $y'_n(t)$, and therefore different waveform pairs, would result).

With the N waveform pairs representative of the channel information at a particular operating point, DPD coefficients are derived at block 730. This derivation of the DPD may be based on an optimization process such as a least-squares minimization procedure computed according to the basis functions used for the linearization system, the input signal, and the sampled output signal of the transmit chain of the linearization system. The computed DPD coefficients are added to a navigation database (at block 740), as a record of data structure, which, in some embodiments, may be a column of a DPD matrix that has K rows (with each row corresponding to one of K DPD coefficients that are subsequently used to perform DPD processing). In some embodiments, the navigation database (matrix) may be configured to have a pre-determined number of records (columns), M Thus, at block 750, a determination is made of whether M different sets of DPD coefficients have been computed. If not (i.e., construction of the navigation matrix has not yet been completed), then, at block 760, the calibration procedure changes the operating conditions (e.g., the ambient temperature, the load conditions, the supply voltage, etc.), and a new set of DPD coefficients, determined according to the operations of 710-750 of the calibration phase of the procedure 700 is performed for the new operation point.

If it is determined that M sets/records of DPD coefficients (for each of M different operating points) have been computed, then the navigation matrix can be deployed and run for normal runtime operation (either at the device where the calibration phase was performed, or at a different device to which the navigation matrix, and/or other components relating to the runtime operation, are communicated through a wireless or wired network link). The database, once deployed, is ready to be used by navigating it based on partial or incomplete channel information (at block 770). For example, as discussed in relation to FIG. 6, the observation receiver of the device at which the navigation database (matrix) is deployed may sample an input signal at a fixed frequency, or at some pre-determined sampling frequencies, with the number of such pre-determined sampling frequencies generally being smaller than the number N of frequency adjustments performed during the calibration phase. As noted, the bandwidth of the observation receiver is smaller (and generally is substantially smaller) than the transmit chain bandwidth of the device.

As noted, in some embodiments, navigation of the database may be performed by obtaining one or more sample points (e.g., a single sample point $x_1(t_i)$ and $y_1(t_i)$), and performing an optimization procedure to, for example, compute weight coefficients to be applied to the M sets of DPD coefficients that would minimize:

$$f_0 = \mathrm{argmin}(\|AL \times f - b\|)$$

Alternatively, in some embodiments, the optimization of weight coefficients may be performed on a subset of the columns of the navigation matrix, e.g., using columns that are associated with operating points closer to a current operating point in circumstances where additional information about the current operating point (e.g., the temperature, the load conditions, etc.) is known. For example, if a particular current temperature and/or load conditions are measured, columns of the matrix that are associated (the matrix or database may maintain data representative of operating conditions) with temperatures and/or load conditions that deviate from the current temperature and/or load conditions by more than some predetermined threshold amounts may be excluded from computation of the linear combination weights. In such embodiments, the weight coefficients are computed to provide a linear combination only of those sets of DPD coefficients corresponding to the subset of columns of the navigation matrix. Other procedures and schemes to obtain weight coefficients that are applied to one or more of the columns of the navigation matrix may be used.

Figure 8:
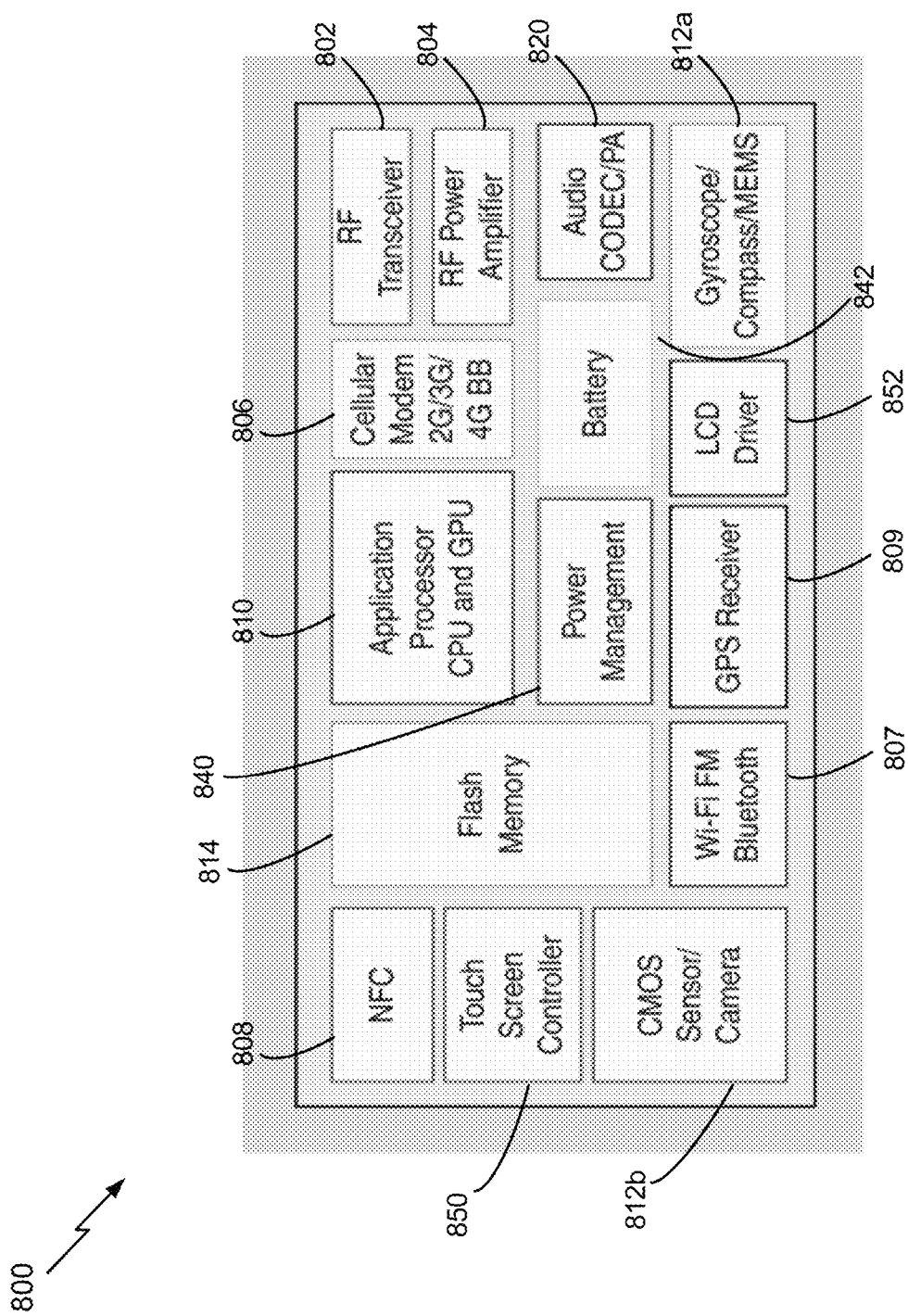
FIG. 8 is a block diagram of an example device to implement digital predistortion.

With reference next to FIG. 8, a block diagram of an example device 800 (e.g., a mobile device or handset, although a similar configuration may also be used to implement a network node, such as a WLAN access point or a WWAN base station, etc.), which may be used to implement the digital predistortion procedures and systems described herein, is shown. It is to be noted that one or more of the modules and/or functions illustrated in the example device of FIG. 8 may be further subdivided, or two or more of the modules or functions illustrated in FIG. 8 may be combined. Additionally, one or more of the modules or functions illustrated in FIG. 8 may be excluded. The various modules and components of the device 800 may be connected through a bus or through other electrical connections and interfaces (not shown in FIG. 8).

The example device 800 may include an RF transceiver 802 (also referred to as an RF communication module) comprising one or more RF transceivers that may be connected to one or more antennas and to an RF front end unit comprising, for example, an RF power amplifier 804, and a cellular modem 806. The RF amplifier may include an amplification, digital predistortion, and/or CFR circuitry to mitigate non-linear behavior caused by the amplifier or other elements of a transmit chain. The modem circuitry implemented by the cellular modem 806 is generally configured to perform modulation and demodulation operations for wireless signals in various bands and for various communication protocols (including 2G, 3G, 4G, 5G, and various other communication technologies in licensed and unlicensed bands). The RF front end circuitry, which may comprise the blocks 804 and 806 depicted in FIG. 8, may thus include power amplifiers, LNAs, digital-to-analog converters, analog-to-digital converters, filters, switches and other RF front-end modules, and, in some embodiments, at least some of the RF front end modules may be arranged to realize, at least in part, the linearization system implementations described herein. The transceivers of the RF transceiver block 802 may comprise suitable devices, hardware, and/or software for communicating with and/or detecting signals to/from a network or remote devices. In some embodiments, the RF transceiver 802 may support wireless LAN communication (e.g., WLAN, such as WiFi-based communications) to thus cause the device 800 to be part of a WLAN. As noted, in some embodiments, the RF transceiver 802 may also support the device 800 to communicate with one or more cellular access points (also referred to as a base station), which may be used for wireless voice and/or data communication. The transceiver 802 may be used to communicate according to any type of WWAN protocol, including any 3GPP or IEEE standards (implemented over licensed and unlicensed frequency bands).

In some implementations, short range communication may be realized through dedicated circuitry such as the circuitry implemented by a WiFi FM Bluetooth module 807. The module 807 may thus be configured to allow the device 800 to communicate with in-range remote devices configured according to any short-range communication protocol. In addition, the device 800 may also include a wired network connection (e.g., implemented using a USB port, or some other wired port) to communicate with another device. Another communication module that may be included with the device 800 is a near-field communication (NFC) module 808 configured to allow communication with neighboring device according to NFC protocols. In some variations, the device 800 may also include a GPS receiver 809 connected to one or more antennas, and configured to receive satellite signals. The GPS receiver 809 may comprise any suitable hardware and/or software for receiving and processing GPS signals from satellite vehicles. The GPS receiver 809 may request information as appropriate from the other systems, and may perform the computations necessary to determine the device's 800 position using, in part, measurements obtained by any suitable satellite positioning system (SPS) procedure. Such positioning information may be used, for example, to determine the location and motion of the device 800.

With continued reference to FIG. 8, the device 800 may include one or more sensors that communicate, through wired or wireless communication links, with a controller/processor 810 (comprising, for example, an application processor CPU and GPU). The one or more sensors may include motion sensors (also referred to as orientation or inertial sensors), such as a gyroscope/compass sensor 812*a*, that may be implemented using micro-electro-mechanical systems (MEMS) technology. Other examples of motion sensors include an accelerometer, a magnetometer, etc. Another type of sensor that may be used is an audio sensor (e.g., a microphone) to record voice or sound information (which may then be converted to audio data via an audio CODEC/PA module 820, with the audio data then optionally transmitted to a remote device via the front end circuitry and the RF transceiver 802 or one of the other communication modules of the device 800). Also illustrated in FIG. 8 is a CMOS sensor/camera 812b configured to capture and record optical/light signals to produce still or moving images. Other types of sensors may also be included with the device 800.

The controller/processor 810 may be connected to the various communication modules and/or the front-end circuitry, and to the various sensors. As noted, the controller may include one or more microprocessors, microcontrollers, and/or digital signal processors that provide processing functions, as well as other computation and control functionality. The device 800 may also include special purpose logic circuitry, e.g., an FPGA (field programmable gate array), an ASIC (application-specific integrated circuit), a DSP processor, a graphics processing unit (GPU), an accelerated processing unit (APU), an application processor, customized dedicated circuitry, etc., to implement, at least in part, the processes and functionality for the device 800. The controller 810 may be coupled to a memory 814 (shown in FIG. 8 as flash memory) for storing data and software instructions for executing programmed functionality within the device. Generally speaking, a computer accessible storage medium may include any non-transitory storage media accessible by a computer during use to provide instructions and/or data to the computer. For example, a computer accessible storage medium may include storage media such as magnetic or optical disks and semiconductor (solid-state) memories, DRAM, SRAM, etc.

The device 800 may be configured to (e.g., via hardware resident in the device and/or software modules/applications provided on the memory 814) to implement digital predistortion processing, including calibration stage processing and runtime processing, according to the procedures described herein, including the procedures depicted in FIGS. 4, 6, and/or 7. The memory 814 may be on-board the controller 810 (e.g., within the same IC package), and/or may be external memory to the processor and coupled thereto over a data bus.

The example device 800 may further include a user interface which provides any suitable interface systems, such as a microphone/speaker (which may be included with the Audio CODEC/PA module 820), keypad or a touchscreen 850 (or some other user-interface input mechanism), and a display 852 (shown as LCD Driver) that allows user interaction with the device 800. Such a user interface, be it an audiovisual interface (e.g., a display and speakers), or some other type of interface (visual-only, audio-only, tactile, etc.), configured to provide status data, alert data, and so on, to a user using the device 800. The microphone/speaker facilitates voice communication functionality, and may also include or be coupled to a speech synthesizer (e.g., a text-to-speech module) that can convert text data to audio speech so that the user can receive audio notifications. Such a speech synthesizer may be a separate module, or may be integrally coupled to the microphone/speaker or to the controller 810 of the device of FIG. 8. The input interface (that includes the touchscreen controller 850) may further include suitable buttons for user input. The display (controlled by the LCD Driver 852) may include any suitable display, such as, for example, a backlit LCD display.

The device 800 may further include a power management unit 840 that controls power consumption of the device provided through a power storage device 842 (e.g., a battery) coupled to the power management unit. In some embodiments, the power management unit 840 may include (or may regulate) a power conversion module that receives and regulates power from an outside source (e.g., AC power or wirelessly transmitted power), with such received power being used to recharge the battery 842.

Some of the implementations described herein, as illustrated in FIGS. 1-7 and 9A-D, are applicable to a wide range of technologies that include RF technologies (including WWAN technologies, such as cellular technologies, and WLAN technologies), satellite communication technologies, cable modem technologies, wired network technologies, optical communication technologies, and all other RF and non-RF communication technologies. The implementations described herein encompass all techniques and embodiments that pertain to use of digital predistortion (single and multi-band) in various different communication systems.

In some implementations, a computer accessible non-transitory storage medium includes a database (also referred to a "design structure" or "integrated circuit definition dataset") representative of a system including some or all of the components of the subsampled digital predistortion implementations of the systems described herein. Generally speaking, a computer accessible storage medium may include any non-transitory storage media accessible by a computer during use to provide instructions and/or data to the computer. For example, a computer accessible storage medium may include storage media such as magnetic or optical disks and semiconductor memories. Generally, the database representative of the system may be a database or other data structure which can be read by a program and used, directly or indirectly, to fabricate the hardware comprising the system. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represents the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. In other examples, the database may itself be the netlist (with or without the synthesis library) or the data set.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

Although particular embodiments have been disclosed herein in detail, this has been done by way of example for purposes of illustration only, and is not intended to be limit the scope of the invention, which is defined by the scope of the appended claims. Features of the disclosed embodiments can be combined, rearranged, etc., within the scope of the invention to produce more embodiments. Some other aspects, advantages, and modifications are considered to be within the scope of the claims provided below. The claims presented are representative of at least some of the embodiments and features disclosed herein. Other unclaimed embodiments and features are also contemplated.

What is claimed is:

1. A method for digital predistortion, the method comprising:
   applying at least one input signal to a power amplification system, comprising a transmit chain with at least a power amplifier that produces output with non-linear distortions, to produce at least one output signal;
   measuring at least one observed signal of the at least one output signal using an observation receiver coupled to an output of the transmit chain of the power amplification system, the observation receiver having a receiver bandwidth smaller than a transmit chain bandwidth of the transmit chain, wherein measuring the at least one observed signal comprises measuring multiple frequency segments of the at least one output signal; and
   determining one or more sets of digital predistortion coefficients controlling operations of a digital predistorter applied to signals inputted to the transmit chain based, at least in part, on the measured multiple frequency segments of the at least one output signal, wherein each of the one or more sets of digital predistortion coefficients is associated with a respective one of one or more sets of operating conditions of the power amplification system.

2. The method of claim 1, wherein determining the one or more sets of digital predistortion coefficients controlling the operations of the digital predistorter comprises:
   arranging the determined one or more sets of digital predistortion coefficients into M records in a data structure, each of the M records including K digital predistortion coefficients, wherein M represents a number of the one or more sets of operating conditions.

3. The method of claim 2, wherein the data structure is configured to be accessed to compute digital predistortion coefficients applied to subsequent input signals provided to the transmit chain, the digital predistortion coefficients computed as a weighted combination of at least some of the one or more sets of digital predistortion coefficients derived based on at least one of sensed subsequent outputs of the transmit chain responsive to the subsequent input signals.

4. The method of claim 2, wherein arranging the determined one or more sets of digital predistortion coefficients comprises:
   arranging the one or more sets of digital predistortion coefficients in a K×M matrix, L.

5. The method of claim 4, further comprising:
   deriving a reduced size matrix, L', with a reduced number of columns M', from the matrix L, wherein M'<M.

6. The method of claim 5, wherein deriving the reduced size matrix, L', comprises:
   applying a singular value decomposition process on the matrix L to derive the reduced size matrix L'.

7. The method of claim 1, wherein measuring the multiple frequency segments comprises:
   obtaining signal measurements of the at least one output signal at substantially equal frequency steps covering the transmit chain bandwidth.

8. The method of claim 7, wherein obtaining the signal measurements of the at least one output signal at the substantially equal frequency steps comprises:
   obtaining N signal measurements of the at least one output signal at the substantially equal frequency steps, wherein N is computed according to $$N = \left\lceil \frac{BW_{TX}}{BW_{RX}} \right\rceil_{CEIL},$$

wherein $BW_{TX}$ is the transmit chain bandwidth, and wherein $BW_{RX}$ is the receiver bandwidth of the observation receiver.

9. The method of claim 8, wherein obtaining the N signal measurements comprises:
   performing N adjustments of a receiver oscillation frequency, $LO_{RX}$, generated by a local oscillator of the observation receiver; and
   at each of the N adjustments of the receiver oscillation frequency, measuring a respective one of the multiple frequency segments of the at least one output signal.

10. The method of claim 9, wherein performing the N adjustments of the receiver oscillation frequency comprises:
    adjusting the receiver oscillation frequency according to:

$$LO_{RX} = LO_{TX} - \left\lceil \frac{BW_{TX}}{2} \right\rceil_{CEIL} + (n-1) \times BW_{RX}$$

$$\forall \in 1, 2, \ldots N,$$

wherein $LO_{TX}$ is a transmit oscillation frequency of a transmit chain local oscillator.

11. The method of claim 1, wherein the one or more sets of operating conditions of the power amplification system comprise one or more of: a temperature of the power amplification system, output power of the power amplification system, loading conditions for the power amplification system, power supply voltage for the power amplification system, or device type for the power amplification system.

12. The method of claim 1, wherein measuring the multiple frequency segments of the at least one output signal comprises:
    subsampling a measured signal observed with the observation receiver of the at least one output signal of the output of the transmit chain to produce a resultant subsampled signal having a spectral representation that is a folded copy of an original spectral representation of the measured signal.

13. The method of claim 12, wherein the observation receiver includes a local oscillator operating at a fixed local frequency.

14. The method of claim 12, wherein the observation receiver is implemented without an anti-aliasing filter.

15. The method of claim 1, wherein determining the one or more sets of digital predistortion coefficients comprises:
determining a particular set of digital predistortion coefficients from the one or more sets of digital predistortion coefficients by applying a minimization procedure to derive a set of predictor coefficients that minimize a function applied to a particular one of the at least one input signal and the measured multiple frequency segments of a resultant particular one of the at least one output signal.

16. The method of claim 15, wherein determining the particular set of digital predistortion coefficients from the one or more sets of digital predistortion coefficients by applying the minimization procedure comprises:
applying a regularized minimization procedure to compute the particular set of digital predistortion coefficients according to:

$$x_{OR} = \mathrm{argmin}(\|Ax-b\| + \rho\|x\|)$$

where $\rho$ is a regularization coefficient, and $x_{OR}$ is a vector of optimal coefficients with regularization.

17. A method for digital predistortion, the method comprising:
measuring, by an observation receiver of a power amplification system comprising a transmit chain with at least a power amplifier that produces output with non-linear distortions, an observed output signal resulting from an input signal provided to the transmit chain, the observation receiver having a receiver bandwidth smaller than a transmit channel bandwidth of the transmit chain, wherein the observed output signal is associated with an observed output signal bandwidth; and
determining, based on the observed output signal, digital predistortion coefficients, to be applied to input signals provided to the transmit chain, as a weighed combination of at least some of pre-determined sets of digital predistortion coefficients computed according to an earlier applied calibration procedure associated with a calibration frequency bandwidth for measuring early output signals of the transmit chain resulting from application of respective early input signals during respective early sets of operating conditions for the power amplification system, the calibration frequency bandwidth being larger than the observed output signal bandwidth.

18. The method of claim 17, wherein determining, based on the observed output signal, the digital predistortion coefficients as the weighed combination of at least some of pre-determined sets of digital predistortion coefficients comprises:
deriving weight coefficients applied to the at least some pre-determined sets of digital predistortion coefficients based on minimization procedure applied to the observed output signal and the input signal.

19. The method of claim 17, wherein the pre-determined sets of digital predistortion coefficients are arranged into M records in a data structure, each of the M records comprising K digital predistortion coefficients, wherein M is a number of the early sets of operating conditions for the power amplification system.

20. The method of claim 19, wherein the data structure is representative of a K×M matrix, L.

21. The method of claim 17, wherein the earlier applied calibration procedure comprises, for each set of digital predistortion coefficients associated with a particular one of the early sets of operating conditions:
obtaining N signal measurements of at least one early output signal of the transmit chain, resulting from at least one earlier input signal, at substantially equal frequency steps, such that the calibrated frequency bandwidth equals approximately the transmit chain bandwidth, wherein N is computed according to $$N = \left\lceil \frac{BW_{TX}}{BW_{RX}} \right\rceil_{CEIL},$$

$BW_{TX}$ is the transmit chain bandwidth, and $BW_{RX}$ is the receiver bandwidth of the observation receiver.

22. The method of claim 21, wherein obtaining the N signal measurements of the at least one early output signal comprises:
performing N adjustments of a receiver oscillation frequency, $LO_{RX}$, generated by a local oscillator of the observation receiver; and
at each of the N adjustments of the receiver oscillation frequency, measuring a respective one of the multiple frequency segments of the at least one early output signal.

23. The method of claim 22, wherein performing the N adjustments of the receiver oscillation frequency comprises:
adjusting the receiver oscillation frequency according to:

$$LO_{RX} = LO_{TX} - \left\lceil \frac{BW_{TX}}{2} \right\rceil_{CEIL} + (n-1) \times BW_{RX}$$

$$\forall \in 1, 2, \ldots N,$$

wherein $LO_{TX}$ is a transmit oscillation frequency of a transmit chain local oscillator.

24. The method of claim 22, wherein measuring the respective one of the multiple frequency segments of the at least one early output signal comprises:
subsampling a measured signal, observed with the observation receiver, of the at least one output signal to produce a resultant subsampled signal having a spectral representation that is a folded copy of an original spectral representation of the measured signal.

25. The method of claim 24, wherein the observation receiver includes a local oscillator operating at a fixed local frequency, and wherein the observation receiver is implemented without an anti-aliasing filter.

26. A calibration system for digital predistortion, the system comprising:
a signal measurement circuit configured to:
apply at least one input signal to a power amplification circuit, comprising a transmit chain with at least a power amplifier that produces output with non-linear distortions, to produce at least one output signal; and
measure at least one observed signal of the at least one output signal using an observation receiver coupled to an output of the transmit chain of the power amplification system, the observation receiver having a receiver bandwidth smaller than a transmit chain bandwidth of the transmit chain, wherein the signal measurement circuit configured to measure the at least one observed signal is configured to measure multiple frequency segments of the at least one output signal; and a processor configured to determine one or more sets of digital predistortion coefficients controlling operations of a digital predistorter applied to signals inputted to the transmit chain based, at least in part, on the measured multiple frequency segments of the at least one output signal, wherein each of the one or more sets of digital predistortion coefficients is associated with a respective one of one or more sets of operating conditions of the power amplification system.

27. The calibration system of claim 26, wherein the processor configured to determine the one or more sets of digital predistortion coefficients controlling the operations of the digital predistorter is configured to:

arrange the determined one or more sets of digital predistortion coefficients into M records in a data structure, each of the M records including K digital predistortion coefficients, wherein M represents a number of the one or more sets of operating conditions.

28. The calibration system of claim 26, wherein the signal measurement circuit configured to measure the multiple frequency segments is configured to:

obtain signal measurements of the at least one output signal at substantially equal frequency steps covering the transmit chain bandwidth.

29. The calibration system of claim 28, wherein the signal measurement circuit configured to obtain the signal measurements of the at least one output signal at the substantially equal frequency steps is configured to:

obtain N signal measurements of the at least one output signal at the substantially equal frequency steps, wherein N is computed according to $$N = \left\lceil \frac{BW_{TX}}{BW_{RX}} \right\rceil_{CEIL},$$

wherein $BW_{TX}$ is the transmit chain bandwidth, and wherein $BW_{RX}$ is the receiver bandwidth of the observation receiver.

30. The calibration system of claim 26, wherein the signal measurement circuit configured to measure the multiple frequency segments of the at least one output signal is configured to:

subsample a measured signal observed with the observation receiver of the at least one early output signal of the output of the transmit chain to produce a resultant subsampled signal having a spectral representation that is a folded copy of an original spectral representation of the measured signal.

31. A digital predistorter comprising:

an observation receiver of a power amplification system comprising a transmit chain with at least a power amplifier that produces output with non-linear distortions, the observation receiver configured to measure an observed output signal resulting from an input signal provided to the transmit chain, the observation receiver having a receiver bandwidth smaller than a transmit chain bandwidth of the transmit chain, wherein the observed output signal is associated with an observed output signal bandwidth; and an adaptation module configured to determine, based on the observed output signal, digital predistortion coefficients, to be applied to input signals provided to the transmit chain, as a weighed combination of at least some of pre-determined sets of digital predistortion coefficients computed according to an earlier applied calibration procedure associated with a calibration frequency bandwidth for measuring early output signals of the transmit chain resulting from application of respective early input signals during respective early sets of operating conditions for the power amplification system, the calibration frequency bandwidth being larger than the observed output signal bandwidth.

32. The digital predistorter of claim 31, wherein the adaptation module configured to determine, based on the observed output signal, the digital predistortion coefficients as the weighed combination of at least some of pre-determined sets of digital predistortion coefficients is configured to:

derive weight coefficients applied to the at least some pre-determined sets of digital predistortion coefficients based on minimization procedure applied to the observed output signal and the input signal.

33. The digital predistorter of claim 31, wherein the pre-determined sets of digital predistortion coefficients are arranged into M records in a data structure, each of the M records comprising K digital predistortion coefficients, wherein M is a number of the early sets of operating conditions for the power amplification system.

34. A non-transitory machine-readable medium storing a design structure comprising elements that, when processed in a computer-aided design system, generate a machine-executable representation of a linearization system that is used to fabricate hardware comprising:

an input stage circuit to apply at least one input signal to a power amplification system, comprising a transmit chain with at least a power amplifier that produces output with non-linear distortions, to produce at least one output signal;

a measuring circuit to measure at least one observed signal of the at least one output signal using an observation receiver coupled to an output of the transmit chain of the power amplification system, the observation receiver having a receiver bandwidth smaller than a transmit chain bandwidth of the transmit chain, wherein measuring the at least one observed signal comprises measuring multiple frequency segments of the at least one output signal; and a control circuit to determine one or more sets of digital predistortion coefficients controlling operations of a digital predistorter applied to signals inputted to the transmit chain based, at least in part, on the measured multiple frequency segments of the at least one output signal, wherein each of the one or more sets of digital predistortion coefficients is associated with a respective one of one or more sets of operating conditions of the power amplification system.

* * * * *